(12) United States Patent
Broadhurst et al.

(10) Patent No.: US 10,249,016 B2
(45) Date of Patent: Apr. 2, 2019

(54) GRAPHICS PROCESSING UNITS AND METHODS USING COST INDICATIONS FOR SETS OF TILES OF A RENDERING SPACE

(71) Applicant: Imagination Technologies Limited, Kings Langley (GB)

(72) Inventors: Richard Broadhurst, Kings Langley (GB); John W. Howson, Kings Langley (GB); Steven Fishwick, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/868,694

(22) Filed: Jan. 11, 2018

(65) Prior Publication Data
US 2018/0197271 A1 Jul. 12, 2018

(30) Foreign Application Priority Data
Jan. 12, 2017 (GB) .................................. 1700562.0

(51) Int. Cl.
*G06T 1/20* (2006.01)
*G06T 15/00* (2011.01)
*G09G 5/36* (2006.01)

(52) U.S. Cl.
CPC .............. *G06T 1/20* (2013.01); *G06T 15/005* (2013.01); *G09G 5/363* (2013.01); *G06T 2210/52* (2013.01)

(58) Field of Classification Search
None
See application file for complete search history.

(56) References Cited

U.S. PATENT DOCUMENTS

| 7,176,914 B2* | 2/2007 | Emmot ..................... G06T 1/20 345/418 |
| 8,000,539 B2* | 8/2011 | Guleryuz ............... H04N 19/46 348/384.1 |
| 8,593,466 B2* | 11/2013 | Barringer .............. G06T 15/005 345/502 |
| 9,317,948 B2* | 4/2016 | Tapply .................. G06T 15/005 |
| 9,684,975 B2* | 6/2017 | Baker ................... G06T 11/001 |

(Continued)

FOREIGN PATENT DOCUMENTS

| CN | 105261066 A | 1/2016 |
| GB | 2481099 A | 12/2011 |
| WO | 2013/178245 A1 | 12/2013 |

*Primary Examiner* — Joni Richer
(74) *Attorney, Agent, or Firm* — Vorys, Sater, Seymour and Pease LLP; Vincent M DeLuca

(57) ABSTRACT

A graphics processing unit is configured to process graphics data using a rendering space which is sub-divided into a plurality of tiles. The graphics processing unit comprises one or more processing cores configured to process graphics data. The graphics processing unit also comprises cost indication logic configured to obtain a cost indication for each of a plurality of sets of one or more tiles of the rendering space, wherein the cost indication for a set of one or more tiles is suggestive of a cost of processing the set of one or more tiles. The graphics processing unit also comprises scheduling logic configured to schedule, in dependence upon the cost indications, the sets of one or more tiles for processing on the one or more processing cores.

19 Claims, 13 Drawing Sheets

(56) References Cited

U.S. PATENT DOCUMENTS

| | | | |
|---|---|---|---|
| 2006/0093044 A1* | 5/2006 | Grantham | G06F 3/1446 375/240.28 |
| 2009/0303245 A1 | 12/2009 | Soupikov et al. | |
| 2011/0050713 A1* | 3/2011 | McCrary | G06F 9/3851 345/522 |
| 2011/0148867 A1* | 6/2011 | Yanami | G06T 17/30 345/419 |
| 2015/0135183 A1 | 5/2015 | Kipp | |
| 2015/0350652 A1* | 12/2015 | Nellore | H04N 19/13 375/240.02 |
| 2018/0144437 A1* | 5/2018 | Kakarlapudi | G06T 1/20 |

* cited by examiner

| Time | Core 1 | Core 2 | Core 3 | Core 4 | Core 5 | Core 6 |
|---|---|---|---|---|---|---|
| 1 | 0,0 = 2 | 1,0 = 3 | 2,0 = 3 | 3,0 = 4 | 4,0 = 5 | |
| 2 | | | | | | |
| 3 | | | | | | 5,0 = 7 |
| 4 | 6,0 = 6 | 0,1 = 2 | 1,1 = 3 | | | |
| 5 | | | | | | |
| 6 | | 3,1 = 4 | | 2,1 = 4 | | |
| 7 | | | | | 4,1 = 5 | |
| 8 | | | | | | |
| 9 | 0,2 = 2 | | | | | |
| 10 | | 2,2 = 3 | 5,1 = 8 | 1,2 = 4 | | 6,1 = 7 |
| 11 | 3,2 = 3 | | | | | |
| 12 | | | | | | |
| 13 | | | | | | |
| 14 | | | | | | |
| 15 | 0,3 = 3 | | | | 4,2 = 10 | 2,3 = 3 |
| 16 | | | 1,3 = 4 | | | |
| 17 | | | | | | |
| 18 | 3,3 = 3 | | | 6,2 = 14 | | |
| 19 | | 5,2 =15 | | | | 4,3 = 6 |
| 20 | | | | | | |
| 21 | | | | | 11 | |
| 22 | | | | | | |
| 23 | 6,3 = 9 | | 5,3 = 13 | | | |
| 24 | | | | | | 8 |
| 25 | | | | | | |
| 26 | | | | 5 | | |
| 27 | | 4 | | | | |
| 28 | 3 | | | | | |
| 29 | | | | | | |
| 30 | | | | | | |
| 31 | | | | | | |

FIGURE 6

| Time | Core 1 | Core 2 | Core 3 | Core 4 | Core 5 | Core 6 |
|---|---|---|---|---|---|---|
| 1 | | | | | | |
| 2 | | | | | | |
| 3 | | | | | | 5,1 = 8 |
| 4 | | | | | 6,3 = 9 | |
| 5 | | | | 4,2 = 10 | | |
| 6 | | | | | | |
| 7 | 5,2 =15 | 6,2 = 14 | 5,3 = 13 | | | |
| 8 | | | | | | |
| 9 | | | | | | |
| 10 | | | | | | 5,0 = 7 |
| 11 | | | | | | |
| 12 | | | | 6,0 = 6 | 6,1 = 7 | |
| 13 | | | | | | |
| 14 | | | | | | |
| 15 | | | 4,3 = 6 | | | |
| 16 | | 4,0 = 5 | | | | 3,0 = 4 |
| 17 | 4,1 = 5 | | | 2,1 = 4 | 3,1 = 4 | |
| 18 | | | | | | |
| 19 | | | | | | |
| 20 | | | | | | 1,0 = 3 |
| 21 | 2,2 = 3 | 1,2 = 4 | 1,3 = 4 | 2,0 = 3 | 1,1 = 3 | |
| 22 | | | | | | |
| 23 | | | | | | 3,2 = 3 |
| 24 | 0,3 = 3 | 2,3 = 3 | 3,3 = 3 | 0,0 = 2 | 0,1 = 2 | |
| 25 | | | | | | |
| 26 | //1// | //1// | //1// | 0,2 = 2 | //2// | //2// |
| 27 | | | | | | |

FIGURE 7

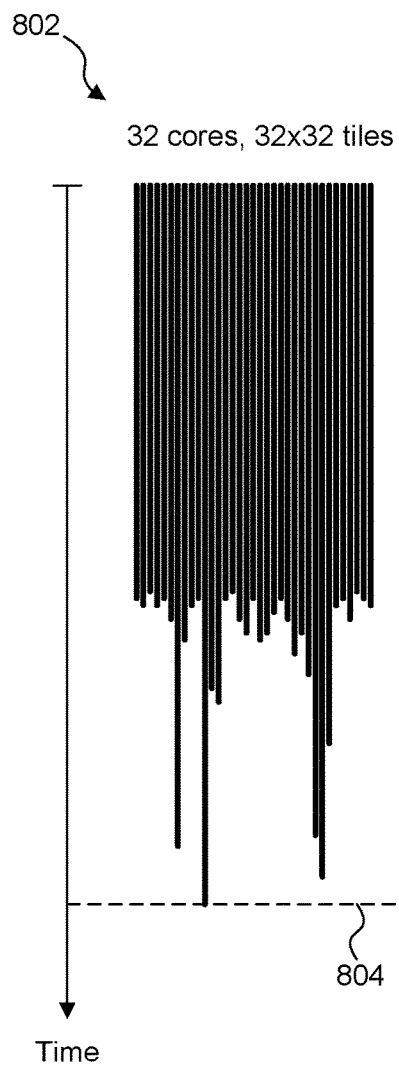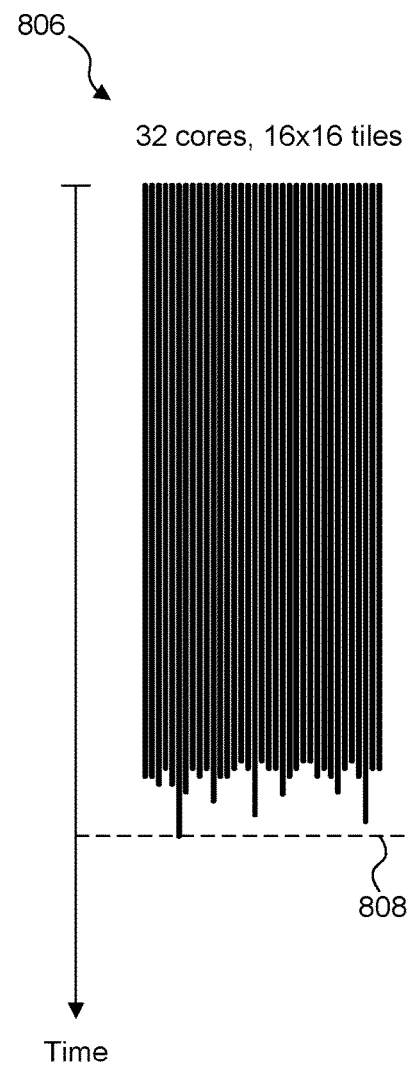
FIGURE 8a
FIGURE 8b

GRAPHICS PROCESSING UNITS AND METHODS USING COST INDICATIONS FOR SETS OF TILES OF A RENDERING SPACE

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

FIG. 1 shows some elements of a graphics processing system 100 which may be used to render an image of a 3D scene. The graphics processing system 100 comprises a graphics processing unit (GPU) 102 and two portions of memory $104_1$ and $104_2$. The two portions of memory $104_1$ and $104_2$ may, or may not, be parts of the same physical memory.

The GPU 102 comprises a pre-processing module 106, a tiling unit 108 and rendering logic 110, wherein the rendering logic 110 comprises a fetch unit 112 and processing logic 113 which includes one or more processing cores 114. The rendering logic 110 is configured to use the processing cores 114 to implement hidden surface removal (HSR) and texturing and/or shading on graphics data (e.g. primitive fragments) for tiles of the rendering space.

The graphics processing system 100 is arranged such that a sequence of primitives provided by an application is received at the pre-processing module 106. In a geometry processing phase, the pre-processing module 106 performs functions such as geometry processing including clipping and culling to remove primitives which do not fall into a visible view. The pre-processing module 106 may also project the primitives into screen-space. The primitives which are output from the pre-processing module 106 are passed to the tiling unit 108 which determines which primitives are present within each of the tiles of the rendering space of the graphics processing system 100. The tiling unit 108 assigns primitives to tiles of the rendering space by creating control streams (or "display lists") for the tiles, wherein the control stream for a tile includes indications of primitives which are present within the tile. The control streams and the primitives are outputted from the tiling unit 108 and stored in the memory $104_1$.

In a rendering phase, the rendering logic 110 renders graphics data for tiles of the rendering space to generate values of a render, e.g. rendered image values. The rendering logic 110 may be configured to implement any suitable rendering technique, such as rasterisation or ray tracing to perform the rendering. In order to render a tile, the fetch unit 112 fetches the control stream for a tile and the primitives relevant to that tile from the memory $104_1$. For example, the rendering unit may implement rasterisation according to a deferred rendering technique, such that one or more of the processing core(s) 114 are used to perform hidden surface removal to thereby remove fragments of primitives which are hidden in the scene, and then one or more of the processing core(s) 114 are used to apply texturing and/or shading to the remaining primitive fragments to thereby form rendered image values. Methods of performing hidden surface removal and texturing/shading are known in the art. The term "fragment" refers to a sample of a primitive at a sampling point, which is to be processed for rendering pixels of an image. In some examples, there may be a one to one mapping of sample positions to pixels. In other examples there may be more sample positions than pixels, and this oversampling can allow for higher quality rendering of pixel values, e.g. by facilitating anti-aliasing and other filtering that may be applied to multiple fragments for rendering each of the pixel values. The texturing and/or shading performed on the fragments which pass the HSR stage determines pixel colour values of a rendered image which can be passed to the memory $104_2$ for storage in a frame buffer. Texture data may be received at the rendering logic 110 from the memory $104_1$ in order to apply texturing to the primitive fragments, as is known in the art. Shader programs may be executed to apply shading to the primitive fragments. The texturing/shading process may include applying further processing to the primitive fragments (e.g. alpha blending and other processes), as is known in the art in order to determine rendered pixel values of an image. The rendering logic 110 processes primitives in each of the tiles and when the whole image has been rendered and stored in the memory $104_2$, the rendered image can be outputted from the graphics processing system 100 and used in any suitable manner, e.g. displayed on a display or stored in memory or transmitted to another device, etc.

In some systems, a particular processing core can be used to perform hidden surface removal at one point in time and texturing/shading at another point in time. In some other systems, some of the processing cores are dedicated for performing hidden surface removal whilst others of the processing cores are dedicated for performing texturing and/or shading on primitive fragments.

The graphics processing system 100 described above is a deferred rendering system because the rendering logic 110 is configured to perform the HSR processing on a primitive fragment before the texturing/shading processing is applied to the primitive fragment. Other graphics processing systems are not deferred rendering system in the sense that they are configured to perform the texturing and/or shading of primitive fragments before the HSR is performed on those primitive fragments. Deferred rendering systems avoid the processing involved in applying texturing and/or shading to at least some of the primitive fragments which are removed by the hidden surface removal process.

If the rendering logic 110 includes more than one processing core 114 then the processing cores can process different data in parallel, thereby improving the efficiency of the rendering logic 110. In some systems, the tiles are assigned to processing cores of the rendering logic 110, such that the graphics data for rendering a particular tile is processed in a single processing core. The graphics data for rendering a different tile may be processed by a different, single processing core. Processing a particular tile on a single processing core (rather than spreading the processing of the particular tile across multiple cores) can have benefits such as an improved cache hit rate. Multiple tiles may be assigned to the same processing core, which can be referred to as having "multiple tiles in flight". When all of the tiles for a render have been processed by the rendering logic 110, the render is complete. Then the results of the render (e.g. a rendered frame) can be used as appropriate (e.g. displayed on a display or stored in a memory or transmitted to another device, etc.), and the rendering logic 110 can process tiles of a subsequent render.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A graphics processing unit is configured to process graphics data using a rendering space which is sub-divided into a plurality of tiles. The graphics processing unit comprises one or more processing cores configured to process graphics data. The graphics processing unit may also comprise cost indication logic configured to obtain a cost indication for each of a plurality of sets of one or more tiles of the rendering space, wherein the cost indication for a set of one or more tiles is suggestive of a cost of processing the set of one or more tiles. The graphics processing unit also comprises scheduling logic which may be configured to schedule, in dependence upon the cost indications, the sets of one or more tiles for processing on the one or more processing cores. For example, in this way, sets of one or more tiles are scheduled for processing on the processing core(s) according to how much work is likely to be involved in the processing of those tiles. For example, tiles which are likely to involve a lot of work can be scheduled for processing before tiles which are likely to involve less work. This can improve the efficiency of the graphics processing system, e.g. in terms of the amount of time taken to process the graphics data for all of the tiles in the rendering space.

In some examples, the scheduling logic may be configured to subdivide at least one set of one or more tiles of the rendering space to form a plurality of subunits (e.g. subtiles) and to assign at least some of those subunits to different processing cores for rendering. For example, the scheduling logic may be configured to subdivide at least one of the tiles of the rendering space to form a plurality of subtiles and to assign at least some of those subtiles to different processing cores for rendering. The subdivision of tiles can be particularly useful for expensive tiles occurring near the end of a render to reduce the impact on the total render time when expensive tiles are scheduled near the end of a render.

There is provided a graphics processing unit configured to process graphics data using a rendering space which is sub-divided into a plurality of tiles, the graphics processing unit comprising: a plurality of processing cores configured to render graphics data; cost indication logic configured to obtain a cost indication for each of a plurality of sets of one or more tiles of the rendering space, wherein the cost indication for a set of one or more tiles is suggestive of a cost of processing the set of one or more tiles; and scheduling logic configured to assign, in dependence upon the cost indications, the sets of one or more tiles to the processing cores for rendering.

Furthermore, there is provided a method of processing graphics data in a graphics processing system which comprises a plurality of processing cores configured to render graphics data, the graphics processing system being configured to use a rendering space which is sub-divided into a plurality of tiles, the method comprising: obtaining a cost indication for each of a plurality of sets of one or more tiles of the rendering space, wherein the cost indication for a set of one or more tiles is suggestive of a cost of processing the set of one or more tiles; and assigning, in dependence upon the cost indications, the sets of one or more tiles to the processing cores for rendering.

For example, the cost indication for a set of one or more tiles may be based on one or more factors which influence a cost of processing the set of one or more tiles. The scheduling logic may assign the sets of one or more tiles for a render to the processing cores in an order depending upon the cost indications.

The cost indication logic may be configured to determine the cost indications for the sets of one or more tiles of the rendering space. For example, the cost indication logic may be configured to determine a cost indication for a tile of the rendering space by combining scores associated with primitives which are present in the tile, wherein the score associated with a primitive is dependent upon an object type of an object of which the primitive is a part. To give some more examples, the cost indication logic may be configured to determine a cost indication for a tile of the rendering space based on one or more of the following factors: (i) a number of primitives in the tile; (ii) object types associated with the primitives in the tile; (iii) tile coverage area of the primitives in the tile; (iv) characteristics of one or more shader programs which are to be executed for rendering the primitives in the tile; (v) a user input; and (vi) a processing cost of a corresponding tile in a previous render. The cost indication logic may be configured to quantise the cost indications.

The sets of one or more tiles may each comprise a single tile. In other examples, the sets of one or more tiles may each comprise a plurality of tiles. The sets of tiles may be blocks of tiles of the rendering space (i.e. the sets of tiles may be spatially contiguous).

The graphics processing unit may comprise geometry processing logic and rendering logic, wherein the geometry processing logic includes a tiling unit configured to generate control streams for the tiles of the rendering space indicating which primitives are present in the tiles, wherein the cost indication logic is implemented as part of the geometry processing logic, wherein the rendering logic comprises the processing cores and is configured to render primitives in tiles of the rendering space in accordance with the generated control streams, and wherein the scheduling logic determines the assignment of sets of one or more tiles to the processing cores of the rendering logic. The tiling unit may be configured to include the cost indications in the control streams for the tiles.

There is provided a graphics processing unit configured to process graphics data using a rendering space which is sub-divided into a plurality of tiles, the graphics processing unit comprising: one or more processing cores configured to process graphics data; cost indication logic configured to obtain a cost indication for each of a plurality of sets of one or more tiles of the rendering space, wherein the cost indication for a set of one or more tiles is suggestive of a cost of processing the set of one or more tiles; and scheduling logic configured to schedule, in dependence upon the cost indications, the sets of one or more tiles for processing on the one or more processing cores.

Furthermore, there is provided a method of processing graphics data in a graphics processing system which comprises one or more processing cores configured to process graphics data, the graphics processing system being configured to use a rendering space which is sub-divided into a plurality of tiles, the method comprising: obtaining a cost indication for each of a plurality of sets of one or more tiles of the rendering space, wherein the cost indication for a set of one or more tiles is suggestive of a cost of processing the set of one or more tiles; and scheduling, in dependence upon the cost indications, the sets of one or more tiles for processing on the one or more processing cores.

Said one or more processing cores may comprise a plurality of processing cores configured to render the graphics data. Furthermore, the scheduling logic may be configured to assign, in dependence upon the cost indications, the sets of one or more tiles to the processing cores for rendering. The cost indication for a set of one or more tiles may be based on the content of the set of one or more tiles.

In some embodiments, there is provided a graphics processing unit configured to process graphics data using a rendering space which is divided into a plurality of tiles, the graphics processing unit comprising: one or more processing cores configured to render graphics data; and scheduling logic configured to schedule sets of one or more tiles for rendering on the one or more processing cores, wherein the scheduling logic is configured to, for at least one of the sets of one or more tiles of the rendering space, subdivide the set of one or more tiles to determine a plurality of subunits, wherein the scheduling logic is configured to schedule the subunits for rendering on the one or more processing cores. For example, there may be provided a graphics processing unit configured to process graphics data using a rendering space which is divided into a plurality of tiles, the graphics processing unit comprising: a plurality of processing cores configured to render graphics data; and scheduling logic configured to assign sets of one or more tiles to the processing cores for rendering, wherein the scheduling logic is configured to, for at least one of the sets of one or more tiles of the rendering space, subdivide the set of one or more tiles to determine a plurality of subunits, wherein the scheduling logic is configured to assign at least some of the subunits derived from the same set of one or more tiles to different processing cores for rendering.

The graphics processing units described herein may be embodied in hardware on an integrated circuit. There may be provided a method of manufacturing, at an integrated circuit manufacturing system, a graphics processing unit as described herein. There may be provided an integrated circuit definition dataset that, when processed in an integrated circuit manufacturing system, configures the system to manufacture a graphics processing unit as described herein. There may be provided a non-transitory computer readable storage medium having stored thereon a computer readable description of an integrated circuit that, when processed, causes a layout processing system to generate a circuit layout description used in an integrated circuit manufacturing system to manufacture a graphics processing unit as described herein.

There may be provided an integrated circuit manufacturing system comprising:
    a non-transitory computer readable storage medium having stored thereon a computer readable integrated circuit description that describes a graphics processing unit as described herein;
    a layout processing system configured to process the integrated circuit description so as to generate a circuit layout description of an integrated circuit embodying the graphics processing unit; and
    an integrated circuit generation system configured to manufacture the graphics processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:
FIG. 6 illustrates the timing of execution of the sets of tiles on a 6 core GPU when a workload-based scheduling method is used which preferentially fills empty cores first;
FIG. 7 illustrates the timing of execution of the sets of tiles on a 6 core GPU when a scheduling method based on the cost indications is used to assign the sets to the processing cores;
FIG. 8a illustrates a workload distribution over 32 cores for a tile size of 32×32 sample positions;
FIG. 8b illustrates a workload distribution over 32 cores for a tile size of 16×16 sample positions.

Figure 1:
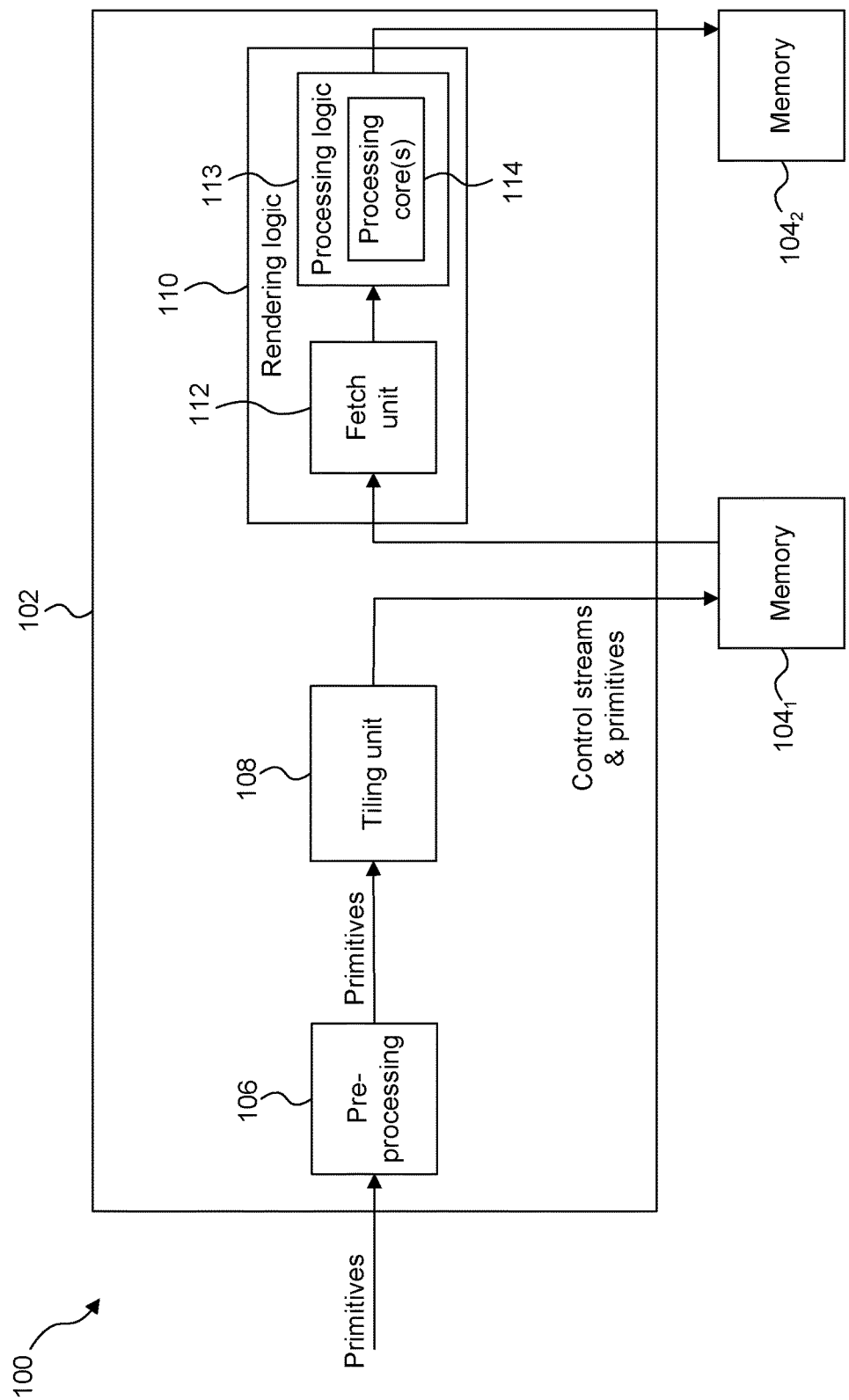
FIG. 1 shows a prior art graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

In the graphics processing system shown in FIG. 1, increasing the number of processing cores will tend to improve the performance of the graphics processing unit in terms of reducing the time taken to process all of the tiles of a render because the processing of the tiles can be divided amongst the processing cores. However, increasing the number of processing cores tends to increase the size (i.e. silicon area) of the GPU and the peak processing power consumed by the GPU.

Figure 2A:
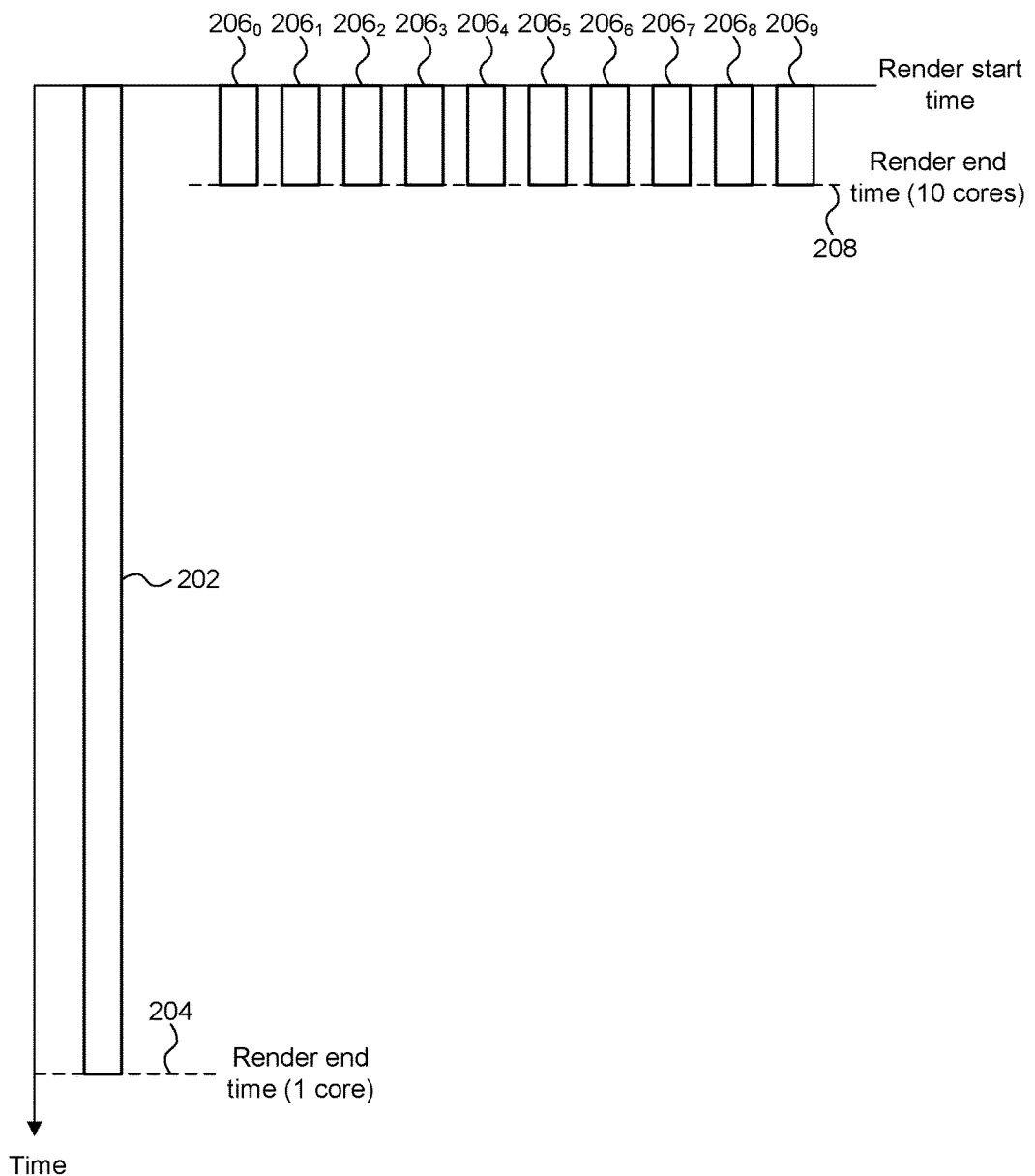
FIG. 2a is a graph illustrating an idealised tile workload distribution on a 1 core GPU and a 10 core GPU.

FIG. 2a is a graph illustrating an idealised tile workload distribution on a 1 core GPU and a 10 core GPU. The vertical axis in FIG. 2a has time running downwards, from a render start time. The block 202 represents the work performed by a single processing core if the GPU 102 uses one processing core 114 for rendering all of the tiles of the rendering space. In this example, the render end time is shown at 204. In this idealised example, the blocks $206_0$ to $206_9$ represent the work performed by the processing cores if the GPU 102 uses ten processing cores 114 for rendering all of the tiles of the rendering space. In this example, the render end time is shown at 208. In this idealised example, each tile incurs the same processing cost, such that the render time with one core is ten times as long as the render time with ten cores.

As an example, consider a frame which consists of only a single render. This render may be 640×480 pixels in size and therefore there may be 300 tiles (arranged as a 20×15 block of tiles) in the frame, where the tiles are each 32×32 pixels in size. If all tiles take an equal amount of time 'T' to process, then a one cluster GPU can be expected to take a time of approximately 300T to complete the render; whereas a ten cluster GPU can be expected to take a time of approximately 30T to complete the render. Therefore in this idealised case, a ten cluster GPU is ten times quicker than a one cluster GPU at completing a render. It is noted that the terms "cluster" and "core" may be used interchangeably herein, both of which refer to a processing unit (including processing components such as arithmetic logic units) which is configured to perform processing operations on incoming data. Furthermore, the terms "frame" and "image" may be used interchangeably herein.

Figure 2B:
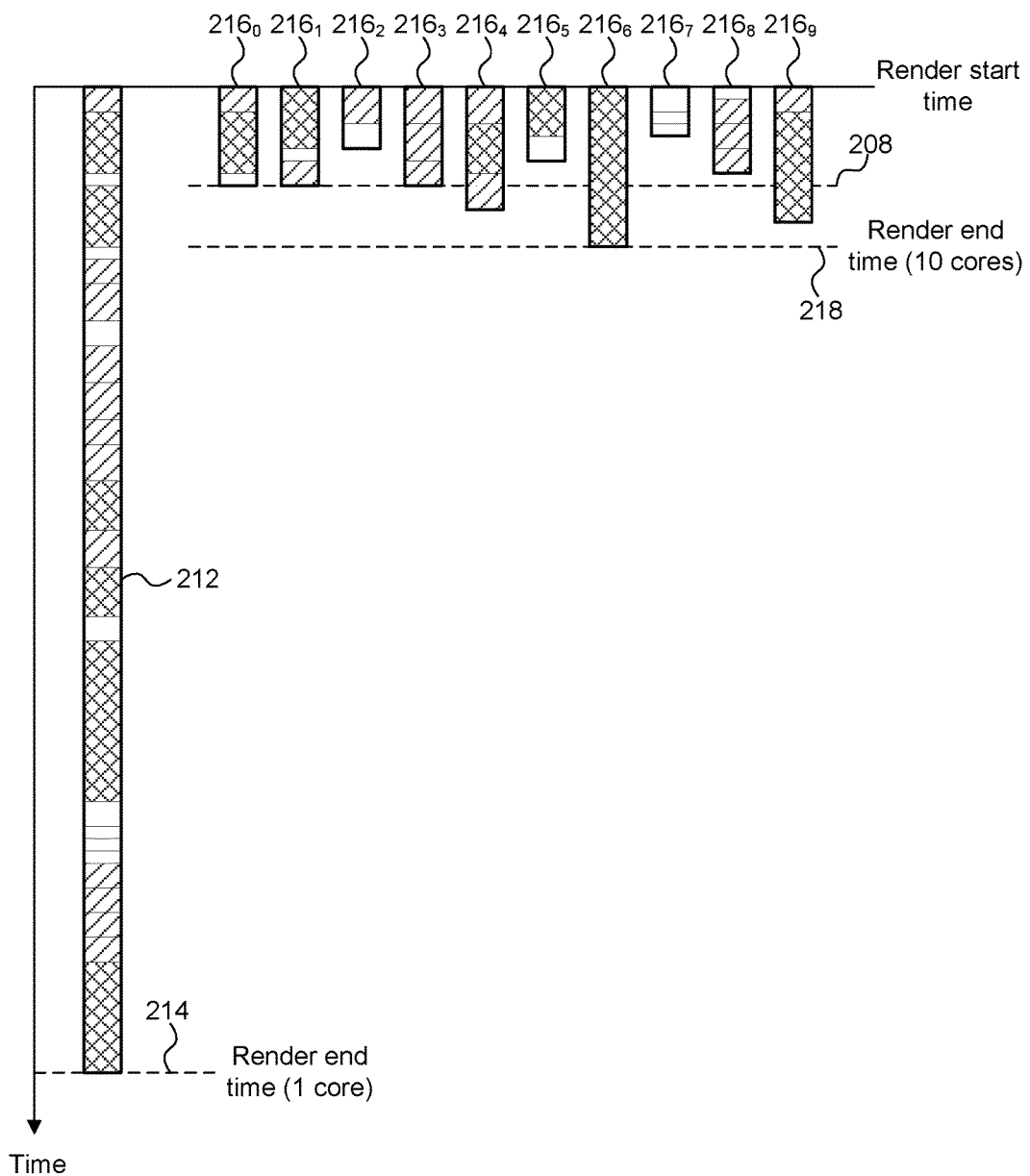
FIG. 2b is a graph illustrating a tile workload distribution on a 1 core GPU and a 10 core GPU with small variations in the costs of the tile workloads.

However, the perfectly balanced workload shown in FIG. 2a is rarely what happens in real graphics workloads. Allowing for even a small random variation in the work of each tile can significantly modify the overall runtime of the frame on multiple cores even when the total workload in the frame remains constant as shown in FIG. 2b. FIG. 2b is a graph illustrating a tile workload distribution on a 1 core GPU and a 10 core GPU with small variations in the costs of the tile workloads. In FIG. 2b a third of the tiles are 'low cost' tiles (shown as unhatched workloads), a third of the tiles are 'medium cost' tiles (shown with diagonal hatching) and a third of the tiles are 'high cost' (shown with cross hatching). The 'cost' of a tile may refer to the amount of time taken to process the tile (as in the example shown in FIG. 2b). In other contexts, the cost of a tile may refer to the amount of processing resources used, the amount of data transferred to/from memory, or the processing power used for processing the tile, etc.

In FIG. 2b, the block 212 represents the work performed by a single processing core if the GPU 102 uses one processing core 114 for rendering all of the tiles of the rendering space. In this example, the render end time is shown at 214, which is the same as render end time 204 shown in FIG. 2a. In this example, the blocks $216_0$ to $216_9$ represent the work performed by the processing cores if the GPU 102 uses ten processing cores 114 for rendering all of the tiles of the rendering space. In this example, the render end time is shown at 218. The dashed line 208 shows the render end time in the idealised example of FIG. 2a. A render is complete when all of the tiles of the render have been processed. Before a current render can begin execution, a previous render may need to be completed, i.e. the current render waits for the previous render to complete before commencing execution of tiles of the current render. It can be seen in FIG. 2b that the variation in the processing costs of the tiles results in a longer render time when multiple cores are used, i.e. render end time 218 is after idealised render end time 208. A render may be for generating pixel values of a frame, such that completing the render involves storing pixel values in a framebuffer to represent a frame, which can then be used in any appropriate manner, e.g. displayed on a display, stored or transmitted, etc. In other examples, a render may not result in a finished frame, e.g. the render may be a sub-render which can be used in a subsequent rendering process for generating a frame. For example, a sub-rendering could be a 'render to texture' such that the result of the rendering is a texture which can then be applied to a subsequent rendering process for generating an image. As other examples, a sub-rendering may be a shadow map or an environment map for subsequent use in rendering a frame.

GPUs with real applications may typically run many tiles per render (e.g. 2000 tiles) and may contain many renders (e.g. 20). This gives a lot of scope for random variation beyond that shown in FIG. 2b. When tiles are individually assigned to particular processing cores, there may be a random probability of consecutively executing slow tiles (i.e. tiles with high processing costs) on a single processing core. In systems which assign groups of more than one spatially-adjacent tile to a processing core, there may be a worse than random probability of consecutively executing slow tiles being assigned to a single core. As described in more detail below, this is because slow tiles typically correspond to complex regions of the scene/objects, so since the tiles in the group are spatially-adjacent then if one tile in the group is expensive then it is likely that the other tiles in the group will also be expensive. The slowest core represents a limiting factor for the render and therefore the core that finishes last determines the time it takes to execute the render and by extension both the framerate of the application and the efficiency of the hardware. Averaged out over many thousands of tiles it might be expected that a random allocation scheme would average out to be reasonably well balanced, however that is often not true. There are three fundamental reasons for this:

1) By design, tile based GPUs often aim to process spatially local tiles on the same cluster in order to maximise the efficiency of caches. Spatially local tiles commonly share lots of data, including things like textures, instructions, shaders, etc. which means it may be beneficial from a cache coherency perspective to keep multiple neighbouring tiles within the same cluster. This tends to mean that the worst case scheduling of back to back expensive tiles on a single core is not only possible but positively reinforced.

2) The workload in graphics applications such as games is typically not evenly distributed across the frame. Some regions of the frame may contain scene objects or effects that are particularly time consuming to compute (i.e. have a high processing cost). Common examples are translucent objects, punch-through objects (objects with transparent areas defined by textures or shaders), effects that require multiple layers to be blended together and some shader effects that are computationally expensive but applied only to some objects/regions of the scene. It is noted that punch through is a technique where an object may or may not have regions that are transparent, and the presence or location of these transparent regions is not known until runtime when visibility is either calculated or fetched from a texture. A common and very expensive example is foliage where leaves are drawn as simple polygons (e.g. rectangles or triangles) represented by one or more primitives, and the leaf shape is generated by making some parts of the polygon invisible, e.g. by making some primitive fragments invisible within the one or more primitives representing the polygon.

3) An expensive tile that is processed towards the end of a render may cause a significant increase in the time taken for the render, if there are too few other tiles remaining to allow other processing cores to remain busy for the duration of the processing of the expensive tile. Allowing these other cores to become idle is an inefficient use of the processing resources that increases the run time of the whole render.

Due to the nature of realtime graphics a constant stream of renders is performed and the random variations of run time can result in the undesirable effect of creating a stuttering effect in the output presented to an end user. Stuttering occurs when a screen updates the display at a particular frequency (e.g. 60 Hz). If the frame to frame variations mean that sometimes an updated frame is available before the screen updates (resulting in smooth motion), but at other times it is not available (resulting in a previous frame being repeated) there will be a perceptible stuttering in the final output images.

In examples described herein, work is scheduled for processing cores of a multi-core GPU based on cost estimates for the different items of work. In particular, for each tile of a render a cost indication is determined, and then tiles can be assigned to the processing cores based on the cost indications. A cost indication for a tile indicates, or at least suggests, a cost of processing the tile. For example, a cost indication may indicate a likely cost of processing the tile. Scheduling the tiles in this manner can reduce the likelihood of starting the processing of a high cost tile near the end of a render. As described above, starting to process high cost tiles near the end of a render can be particularly detrimental to the overall render time, so reducing the likelihood of this occurring can improve (i.e. reduce) the average render time. Therefore, sets of tiles with relatively high cost indications are preferentially scheduled before sets of tiles with relatively low cost indications. In this description, a high cost indication means a high processing cost, and a low cost indication means a low processing cost. In some examples, the cost indication for a set of one or more tiles is indicative of one or more factors which influence a cost of processing the set of one or more tiles.

Figure 3:
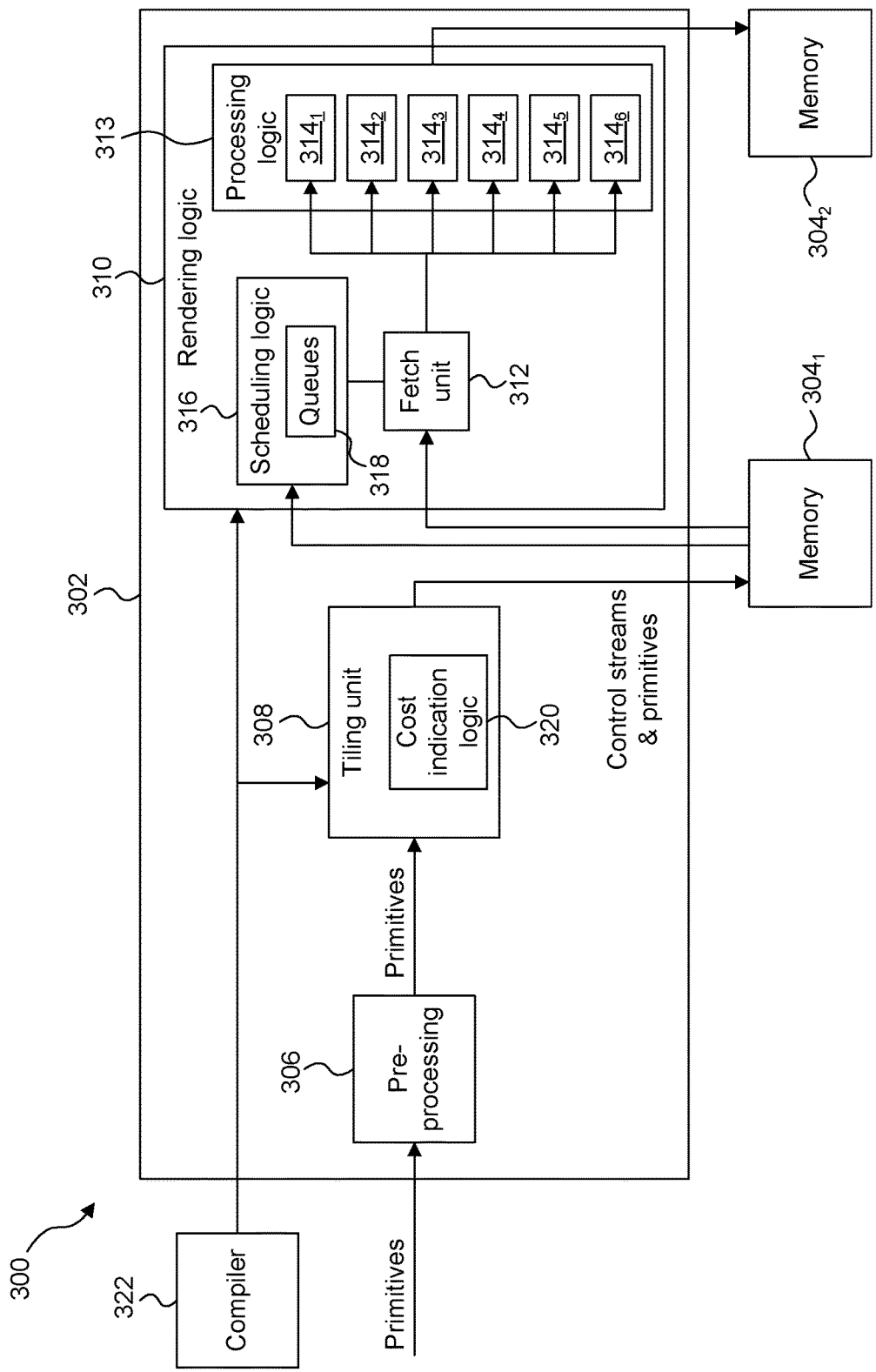
FIG. 3 shows a graphics processing system.

FIG. 3 shows some elements of a graphics processing system 300 which may be used to render an image of a 3D scene. The graphics processing system 300 comprises a graphics processing unit (GPU) 302 and two portions of memory $304_1$ and $304_2$. The two portions of memory $304_1$ and $304_2$ may, or may not, be parts of the same physical memory. The GPU 302 comprises a pre-processing module 306, a tiling unit 308 and rendering logic 310, wherein the rendering logic 310 comprises a fetch unit 312, processing logic 313 which includes one or more processing cores ($314_1$ to $314_6$) and scheduling logic 316 which comprises one or more rendering queues 318. The rendering logic 310 is configured to use the processing cores 314 of the processing logic 313 to implement hidden surface removal (HSR) and texturing and/or shading on graphics data (e.g. primitive fragments) for tiles of the rendering space. The tiling unit 308 comprises cost indication logic 320. The graphics processing system 300 also comprises a compiler 322 configured to compile programs (e.g. shader programs) to be executed on the GPU 302. The compiler 322 may write compiled shader programs to an intermediate memory, wherein at runtime the GPU 302 retrieves the compiled shader programs from the intermediate memory, but for simplicity, the intermediate memory is not shown in FIG. 3. In the example shown in FIG. 3 the rendering logic 310 comprises six processing cores $314_1$ to $314_6$, but in other examples any suitable number of processing cores may be included in the rendering logic 310, e.g. in a range from 1 to 256, or even higher. The number of processing cores in the rendering logic 310 may be adapted to suit the intended use of the graphics processing system (e.g. a graphics processing system to be used in a small mobile device which has tight constraints on processing resources and silicon size may include a small number of processing cores (e.g. 6 processing cores), whereas a graphics processing system to be used in a large device such as a PC or server which has less tight constraints on processing resources and silicon size may include a larger number of processing cores (e.g. 128 processing cores)).

The operation of the graphics processing system 300 is described with reference to the flow chart shown in FIG. 4. Graphics data for performing a render is received at the GPU 302, e.g. from a game application running on a CPU in the same computing system as the GPU 302. The graphics data may include primitive data describing primitives of objects in a scene to be rendered. The graphics data may also specify one or more shader programs which are to be executed on the primitive data for rendering the primitives. It is noted that shaders specifying position (e.g. vertex and geometry shaders) are executed on primitives; whereas shaders specifying how the image will be rendered (e.g. pixel shaders) are executed on primitive fragments corresponding to parts of primitives that cover pixels (or more precisely that cover sample positions).

In step S402 the compiler 322 compiles the shader programs which are associated with the primitives and determines characteristics of the shader programs. The characteristics which are determined include characteristics which are indicative of the complexity of the shader program. In particular, the characteristics are determined so as to give an indication of a cost of processing primitives using the particular shader programs. For example, the length of the shader program (e.g. number of operations to be performed) may be identified. Furthermore, shader programs are identified as being potentially high cost if they contain loops that execute for a variable number of times, where that variable number is determined at runtime, i.e. it is not a known number at compilation time. Loops such as this are potentially very costly to execute if they loop a large number of times in runtime. As another example, the compiler could determine an amount of resources, memory reads or registers used by the shader program, and use this as a measure of the processing cost associated with running the shader program. As an example, a shader which involves lots of sampling from textures which may be sampled from external memory will likely take significantly longer to process than one that primarily consists of arithmetic instructions. Other characteristics which may be determined include whether the shader program includes conditional flow control.

Step S402 may be performed prior to runtime, i.e. in an offline process. For example, the shader programs may be compiled when the application loads. In particular, the shader programs may be compiled before the rendering begins (e.g. before the tiling phase begins) and before the shaders are associated with any specific geometry. However, in other examples it would be possible for a shader program to be compiled during runtime before the main rendering begins, e.g. in response to determining that a primitive is to be processed using the shader program. The compiler 322 can flag a wide number of potentially expensive things that may be present in a shader program. The compiler 322 is arranged to provide the determined characteristics of the shader programs to the tiling unit 308. The compiler 322 is arranged to provide the compiled shader programs to the rendering logic to be executed on one or more of the processing cores 314 for processing primitives.

A sequence of primitives provided by an application may be received at the pre-processing module 306. In a geometry processing phase, the pre-processing module 306 performs functions such as geometry processing including clipping and culling to remove primitives which do not fall into a visible view. The pre-processing module 306 may also project the primitives into screen-space. The primitives which are output from the pre-processing module 306 are passed to the tiling unit 308 for tiling as described below.

In step S404 the tiling unit 308 determines which primitives are present within each of the tiles of the rendering space of the graphics processing system 300. The tiling unit 308 assigns primitives to tiles of the rendering space by creating control streams for the tiles, wherein the control stream for a tile includes indications of primitives which are present within the tile. The control streams and the primitives are outputted from the tiling unit 308 and stored in the memory $304_1$. The geometry processing phase (performed by the pre-processing module 306 and the tiling unit 308) takes account of primitives across the whole of an image, i.e. for all of the tiles in the image. Then in the rendering phase, the rendering logic 310 renders tiles of the image and stores the outputs for rendered tiles in appropriate portions of a framebuffer, such that when all of the tiles of an image have been rendered, the framebuffer stores the rendered results for the whole image. In examples described herein, the opportunity that is provided in the geometry processing phase to assess all of the data for an image before tiles are rendered for the image is used to determine information about the image which may be useful for the rendering phase, e.g. to improve the efficiency of the rendering phase. In examples described below, tiles can be scheduled for processing by the rendering logic based on an estimate of the processing cost that will be involved in processing the tiles. This can reduce the likelihood of scheduling high cost tiles near the end of a render.

In step S406 the cost indication logic 320 determines cost indications for the tiles of the rendering space. As described above, the cost indication for a tile suggests a cost of processing the tile. The cost indication logic may determine the cost indications based, at least in part, on the determined characteristics of the shader programs that were determined by the compiler 322 in step S402. Furthermore, in general as described below, cost indications may be determined for sets of one or more tiles, i.e. a cost indication may be determined for a tile and/or a cost indication may be determined for a set of tiles. For simplicity some of the explanation herein refers to there being a cost indication for a tile, but in general it is to be understood that this explanation could be extended to having a cost indication for a set of tiles.

The cost indications may be different in different examples. In some examples, the cost indication for a tile may be an estimate of a processing cost that will be incurred when the tile is processed by the rendering logic 310. As described above, a processing cost could be a length of processing time, a number of computation operations performed, a processing power consumed, a number of reads/writes from/to memory, or any other suitable measure of the cost of processing a tile. However, in some examples, the cost indication for a tile might not be a direct estimate of a processing cost. The cost indication for a set of one or more tiles may be based on the content of the set of one or more tiles. The cost indication for a set of one or more tiles may be based on one or more factors which influence a cost of processing the set of one or more tiles. For example, a cost indication could be a number of primitives which are present in a tile. The number of primitives in a tile is not a direct estimate of the cost of processing the tile, but it is indicative of an approximate processing cost that is likely to be involved in processing a tile. For example, a larger number of primitives in a tile may suggest that the tile will incur a greater processing cost. In a broad sense, the cost indication for a tile could be any parameter which is suggestive of a cost of processing the tile, i.e. a parameter which provides some measure of likely processing cost for use in distinguishing between tiles. It is further noted that the cost indications might not always accurately reflect the true processing costs of processing tiles, but they aim to provide a better indication of processing costs for tiles than if no cost indications were determined at all.

In a simple example, the cost indication for a tile is the number of primitives which are present in the tile. A tile which overlaps with a relatively large number of primitives tends to incur a greater processing cost than a tile with a relatively small number of primitives, so the number of primitives in a tile is a useful cost indication even if it does not always reflect the exact actual processing cost of rendering the tile. Furthermore, the number of primitives in a tile is very simple to calculate in the tiling unit 308 because it can be directly observed from the control stream for the tile, i.e. the number of primitive identifiers included in the control stream for a tile at the end of the tiling phase indicates the number of primitives in that tile. So in this example, the cost indication logic 320 does not add significant complexity to the tiling unit 308.

In a slightly more complex example, the cost indication logic 320 determines the cost indication for a tile by combining scores associated with primitives which are present in tile. The score associated with a primitive may be dependent upon an object type of an object of which the primitives is a part. For example, primitives associated with an opaque object type may be relatively simple to process in the rendering logic 310, so these primitives may be associated with low scores; whereas primitives associated with other object types, e.g. translucent or punch through object types or object types allowing primitives to change their depths during rendering, may be relatively complex to process in the rendering logic 310, so these primitives may be associated with high scores. In particular, the rendering of these more complex object types (e.g. translucency and punch through and types allowing objects to change depth during rendering) may utilise blending or other operations that require multiple passes in the rendering logic 310 to resolve the pixels covered by these primitives. For example, each primitive associated with an opaque object type may be given a score of one, each primitive associated with a translucent or punch through object type may be given a score of ten, and each primitive which may change depth during rendering may be given a score of eight. This reflects a likely difference in the processing costs of the different types of primitives. The scores for the primitives within a tile can be summed, or combined in another way, to provide a cost indication for the tile. In different examples, the scores for different object types may be different to those described herein.

Tessellation is a technique which allows a graphics data item (which may be referred to as a "patch") to be expanded into many primitives during rendering. Tessellation can be useful for representing complex (e.g. curved) surfaces, but can result in a large number of primitives being rendered. A cost indication for a tile could be based on whether tessellation is applied to patches in the tile. As an example, if a tile includes a patch to be tessellated, a cost indication for the tile could depend upon the number of triangles which result from the tessellation of the patch.

In other examples the cost indications may be determined in different ways. For example, the tile coverage area of the primitives in a tile may be considered when determining the cost indication for the tile. The tile coverage area of a primitive indicates a number of sample positions at which that primitive may be visible within the tile, and therefore provides an indication of the amount of processing that will be performed when processing the primitive in the tile in the rendering logic 310. In some examples, a user could provide a user input to guide the determination of the cost indications for the tiles. In this sense the cost indication logic 320 may receive the cost indications for the tiles via an input. For example, a user may be able to specify the cost indications for the tiles directly, e.g. via an API extension, to allow a developer to explicitly provide tile costs to ensure efficient performance using a priori knowledge of the workloads associated with particular tiles.

A driver mechanism may pass information from the compiler 322 to the tiling unit 308, and this information may include the characteristics of the shader programs determined by the compiler 322. Optionally the driver may wish to be used to flag geometry that must be regenerated (e.g. pipeline stages such as geometry shaders and tessellation shaders can be used to expand primitives to create multiple primitives), and in some graphics processing systems the expanded primitives are not stored after the geometry processing phase and must be regenerated before use in the rendering phase. Similarly the driver may also provide information on the frequency at which 3D shading will be performed, e.g. it is possible for the rendering phase to render at a higher pixel rate or a higher sample/fragment rate which is a more costly process. Therefore this information can be useful for the cost indication logic 320 for determining the cost indications.

The examples described above relate to the factors relating to the processing of the current render which can be used to estimate likely processing costs for rendering different tiles of the render. As well as these factors, the cost indication logic 320 could determine the processing costs (either predicted or actual costs) for tiles of a previous render (e.g. the immediately preceding render, e.g. the preceding frame), and can use these as a factor in determining the cost indications for the tiles of the current render. Two frames of a sequence of frames are likely to be similar if they are close to each other in the sequence, e.g. if they are consecutive frames, unless there is a scene change or a sudden change in the content. Therefore, the processing costs of particular tiles in a previous frame provide a good indication of the processing costs of corresponding tiles in a current frame. The "corresponding tiles" in different frames may be tiles in the same position within the rendering space, or may be displaced relative to each other, e.g. by an amount representative of motion of content in the scene (e.g. represented by motion vectors).

To summarise some of the examples described above, the cost indication logic 320 may determine a cost indication for a tile of the rendering space based on one or more of the following factors: (i) a number of primitives in the tile; (ii) object types associated with the primitives in the tile; (iii) tile coverage area of the primitives in the tile; (iv) characteristics of one or more shader programs which are to be executed for rendering the primitives in the tile; (v) a user input; and (vi) a processing cost of a corresponding tile in a previous render. However, it will be apparent that other factors may be used in other examples for determining the cost indications. The cost indication logic 320 may determine the cost indication for a tile based on a plurality of the factors, e.g. according to any suitable combination, which may or may not be weighted in favour of one factor over another factor.

As described above, the characteristics of a shader program may include one or more of: (i) a length of the shader program; (ii) an amount of resources or registers used by the shader program; (iii) whether the shader program includes conditional flow control; (iv) whether the shader program includes loops for which the number of repetitions is undefined at compile time; and (v) a number of memory reads and/or writes used in the shader program.

As described above a cost indication may be determined for each set of one or more tiles. It may be the case that each set of one or more tiles comprises the same number of tiles. In some examples the sets of one or more tiles each comprise a single tile. In other examples, the sets of one or more tiles each comprise a plurality of tiles. The sets of tiles may be blocks of tiles (e.g. contiguous tiles) of the rendering space. The term "block" of tiles is used herein to refer to a plurality of spatially local or adjacent tiles. In particular, the sets of one or more tiles may be arranged to match the assignment of sets of tiles to processing cores 314 in the rendering logic 310. For example, if individual tiles are assigned to particular ones of the processing cores 314 at a time then the sets of tiles may comprise single tiles. However, if blocks of multiple tiles (e.g. 2×2, 4×2 or 4×4 blocks of tiles) are assigned to particular ones of the processing cores 314 at a time then the sets of tiles may comprise corresponding blocks of tiles. As described below, it may be efficient from a cache coherency perspective to assign blocks of tiles to processing cores 314 rather than assigning individual tiles to processing cores 314.

The cost indication logic 320 may quantise the cost indications. In particular, the quantised cost indications may be quantised to be represented by a number of bits, the number of bits being in a range from 1 to 8. In an extreme example, the quantised cost indications each have a single bit, such that they act as a flag to indicate that a tile is either a high cost tile or a low cost tile. Even when the cost indications are quantised to this extent the use of the cost indications can be useful for scheduling the processing of the tiles because it will tend to avoid situations where a high cost tile is scheduled for processing near the end of a render, which as described above can cause a particularly long delay in the render time. Quantising the cost indications reduces the amount of data used to store the cost indications, and as explained below in some examples simplifies the scheduling logic 316 by reducing the number of priority queues implemented therein.

In step S408 the tiling unit 308 includes the determined cost indications in the control streams for the tiles to be stored in the memory $304_1$. For example the tiling unit 308 could include the determined cost indications in a tail pointer cache which includes pointers to the ends of the lists of primitive IDs for respective tiles. The pointers can be included in the tail pointer cache for the tiles of a rendering space at the end of processing the geometry for a render in the tiling unit 308, and at this point the cost indication logic 320 has determined the cost indications for the tiles, so this is a good opportunity to add the cost indications in a suitable place in the control streams without having to significantly alter the operation of the tiling unit 308. At the end of the geometry processing phase the control streams for the tiles (including the cost indications) are stored in the memory $304_1$.

In the rendering phase the scheduling logic 316 receives the control streams for the tiles of the rendering space for a current render. The scheduling logic 316 is shown as being part of the rendering logic 310, but in other examples the scheduling logic 316 may be thought of as a tile sequencer which acts outside of the rendering logic 310 and which determines the order of the tiles to be processed by the rendering logic 310. In some examples, the scheduling logic could be implemented as part of the fetch unit 312.

In step S410 the scheduling logic 316 performs a pre-pass of the control streams in order to analyse the cost indications for the tiles to assign the tiles to the processing cores 314. In this way the scheduling logic assigns, in dependence upon the cost indications, the sets of one or more tiles to the processing cores for rendering. For example, the scheduling logic 316 may assign sets of one or more tiles for the render to the processing cores 314 in an order depending upon the cost indications. In another example, the scheduling logic 316 may assign a plurality of sets of one or more tiles with the highest cost indications to different processing cores 314, to thereby distribute the sets of tiles with the highest cost indications amongst the processing cores 314.

In examples described herein the scheduling logic 316 schedules the sets of tiles for processing on the processing cores 314 in an order that executes relatively high cost tiles before relatively low cost tiles. It is possible to do this because, in a tile based system, each tile is rendered independently of all other tiles. For example, the scheduling logic 316 may maintain a rendering queue 318 for each of the processing cores 314 to indicate which tiles are to be processed by the respective processing cores 314, and the order in which they are to be processed.

The scheduling logic 316 may form a priority queue (different to the rendering queues 318) for sets of tiles for each of the different cost indication values. This works particularly well when the cost indications have been quantised such that there are a small number of distinct cost indication values. The sets of one or more tiles are assigned to the processing cores for rendering in an order according to the contents of the priority queues. For example, if the cost indications are quantised down to 2-bit values, there are four different quantised cost indication values (0, 1, 2 and 3) and hence the scheduling logic 316 maintains four priority queues. Indications of sets of tiles which have a quantised cost indication value of zero are stored in priority queue 0; indications of sets of tiles which have a quantised cost indication value of one are stored in priority queue 1; indications of sets of tiles which have a quantised cost indication value of two are stored in priority queue 2; and indications of sets of tiles which have a quantised cost indication value of three are stored in priority queue 3. When the scheduling logic 316 comes to schedule a set of tiles for processing (e.g. by adding a set to the rendering queue 318 associated with one of the processing cores 314) the scheduling logic 316 will select a set which is identified in priority queue 3 unless priority queue 3 is empty, in which case the scheduling logic 316 will select a set which is identified in priority queue 2 unless priority queue 2 is empty, in which case the scheduling logic 316 will select a set which is identified in priority queue 1 unless priority queue 1 is empty, in which case the scheduling logic 316 will select a set which is identified in priority queue 0 unless priority queue 0 is empty, in which case there are no more sets to schedule.

In step S412 the rendering logic 310 renders the tiles using the processing cores 314 according to the determined scheduling. Steps S410 and S412 may be performed concurrently such that sets of tiles are assigned to processing cores as the processing cores render other, previously assigned, sets of tiles. As described above, in this example, the processing of a particular tile is performed by a single one of the processing cores 314, i.e. the processing of a tile is not divided between multiple processing cores 314. This helps to improve the cache coherency and efficiency of processing by reducing a need to communicate data between the processing cores 314. Step S412 involves the fetch unit 312 fetching the primitive data for rendering a tile and providing the data to the appropriate one of the processing cores 314 (based on the scheduling determined by the scheduling logic 316). The processing logic 313 uses the processing cores 314 to execute operations on the primitive data for a tile in order to render the tile. The processing logic 313 includes other components (not shown in FIG. 3) such as registers, caches, control logic, etc. for performing the processing of the primitive data using the processing cores 314. Caches may be used in the processing logic 313 to store data used by the processing cores 314. Any suitable cache structure could be used (e.g. multi-level or single level), and in particular, there may be some caches which are coupled to at least one, but not all, of the processing cores 314. To give some examples, each processing core 314 could have its own dedicated cache, or each pair of processing cores could have their own dedicated cache.

The processing logic 313 may perform deferred rendering such that hidden surface removal is performed on primitives to remove primitive fragments which are hidden from view by other primitives in the scene, and then texturing and/or shading is applied to the primitive fragments after the hidden surface removal has been applied to those primitive fragments. Texturing typically involves reading texture data from a memory and applying the texture to primitive fragments in order to determine colour values of rendered primitive fragments. Shading typically involves executing shader programs on primitive fragments to add visual effects to the rendering of the primitive fragment. These shader programs are the shader programs mentioned above that were compiled by the compiler 322 and provided to the rendering logic 310. Methods of performing hidden surface removal, texturing and shading are known in the art and as such the details of these methods are not described in detail herein.

In other examples, the processing logic 313 may perform non-deferred rendering such that texturing and/or shading is applied to primitive fragments, and then hidden surface removal is performed on the textured/shaded primitive fragments to remove primitive fragments which are hidden from view by other primitives in the scene. Non-deferred rendering methods may be less efficient than deferred rendering methods because they involve unnecessarily shading and texturing of primitive fragments which are ultimately hidden in the scene.

Both the deferred rendering and non-deferred rendering systems described above implement rasterisation techniques to render primitive data. In other examples, other rendering techniques may be used in the rendering logic, for example a ray tracing technique may be used to render the primitive data. Ray tracing techniques are known in the art and as such the details of implementing a ray tracing rendering technique are not described in detail herein.

In step S414 the results of the render are stored. For example, if the result of the render is a frame then the rendered frame may be stored in the memory $304_2$. A rendered frame may be used in any suitable manner. For example, a rendered frame may be displayed on a display. A rendered frame may be transmitted to another device, e.g. over a network such as the Internet and/or a mobile telephone network. If the render is a sub-render then the result of the render may be for use in a subsequent render, e.g. the result of the sub-render could be a texture, shadow map or environment to be applied in a subsequent render. In this case, the result of the render could be stored (e.g. in memory $304_2$) and subsequently provided back to the rendering logic 310 for use in the subsequent render. Alternatively, the result of the render could be stored on the GPU 302 itself.

Figures 5A, 5B:
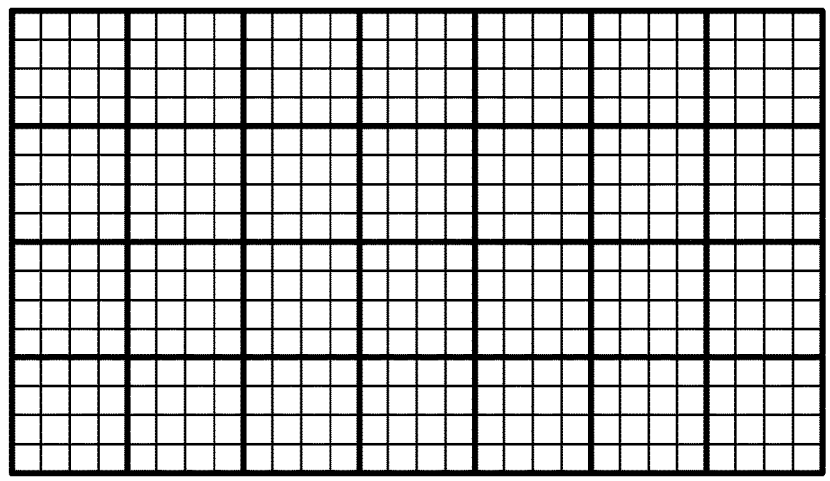
FIG. 5a shows sets of tiles of a rendering space.
FIG. 5b illustrates cost indications for the sets of tiles of the rendering space.

An example is now described with reference to FIGS. 5a to 7. FIG. 5a shows a rendering space 502 which has 896×512 pixels. Each tile is a 32×32 block of pixels, such that the rendering space 502 has 28 columns and 16 rows of tiles as shown in FIG. 5a. The tiles are grouped together into 4×4 blocks as shown by the bold lines in FIG. 5a, wherein each 4×4 block of tiles is to be processed by a particular processing core 314. By processing 4×4 blocks of tiles on the same processing core, the cache hit rate of caches in the processing logic 313 which are used by that processing core 314 may be improved since primitive data that is relevant for one tile is more likely to be relevant for a nearby (e.g. adjacent) tile than it is to be relevant for a distant tile of the rendering space.

In this example, the cost indication logic 320 obtains cost indications for each of the tiles in the rendering space, either by determining the cost indications or by receiving the cost indications via an API as described above. A cost indication is then determined for each of the 4×4 sets of tiles based on the cost indications of the tiles within the respective sets. To give some examples, the cost indication logic may determine the cost indication for a set of tiles by determining: (i) an average of the cost indications of the tiles within that set, (ii) a sum of the cost indications of the tiles within that set, (iii) a maximum of the cost indications of the tiles within that set, or (iv) a number of the tiles within that set which have cost indications above a threshold. In other examples, the cost indications of tiles within a set may be combined in other ways to determine a cost indication for the set as a whole. Furthermore, in some examples, a cost indication is determined for a set of tiles without first determining individual cost estimates for the individual tiles within the set.

FIG. 5b shows cost indications for the 4×4 sets of tiles shown in FIG. 5a. In this example, cost indications are determined for each of the tiles and then the cost indication for a 4×4 set of tiles is determined by combining the cost indications for the individual tiles within that set of tiles (e.g. by finding the sum of the individual cost indications) and then quantising the cost indications down to a 4-bit value. 4-bit values are in a range from 0 to 15. It can be seen that there is a region near the bottom right of the rendering space 502 which is relatively costly to render, e.g. because the graphics content in this region is particularly detailed (e.g. a high number of primitives in this region, which may involve translucent or punch through primitives) or the effects used to render this region require complex shader programs. To give some examples, regions of foliage, smoke, fire or other particle systems in a scene can be costly to render. In contrast the top left region of the rendering space 502 is not so costly to render, e.g. because the graphics data in this region is simple, e.g. this region may represent a plain background with little detail in the scene.

Each set of tiles is to be fully processed by one processing core and in this example the cost indications for the sets of tiles indicate the relative time taken to complete the processing of each set of tiles. If the sets of tiles are to be assigned to the processing cores, a simple scheduler may allocate the sets of tiles in a raster scan order according to a round robin scheme across each of the cores in turn.

An improvement upon this round robin scheduling method is to preferentially schedule work to processing cores that have the least work queued up. This scheduling method is referred to herein as a "workload-based scheduling method". For example, the scheduling logic 316 may add sets of tiles to respective rendering queues for the processing cores 314 during rendering in accordance with the occupancy of the queues. FIG. 6 illustrates the timing of execution of the sets of tiles on a 6 core GPU when a workload-based scheduling method is used which preferentially schedules work to processing cores that have the least work queued up. In the simplified example shown in FIG. 6 the quantized costs for the sets of tiles shown in FIG. 5b are used to represent the actual processing times. The example shown in FIG. 6 does not use the cost indications to schedule the rendering of the tiles. The example shown in FIG. 6 is a simplified example to aid the explanation of the scheduling within the system in which sets of tiles are allocated to particular processing cores when the processing cores become idle. In this simplified example, the rendering queues are not necessary. However, in more complex systems, the rendering queues are used to store work which has been allocated to a core before the core is ready to process it. For example, when a processing core is processing a set of tiles but has no sets of tiles queued in its respective rendering queue, then a set of tiles may be scheduled for the core and added to the respective rendering queue. In this way the scheduling operates slightly less optimally than if the sets of tiles were scheduled for execution on a processing core when that processing core becomes idle. However, by queuing at least one set of tiles for each core in the rendering queues then some processing efficiencies can be achieved, e.g. before a first set of tiles has completely finished being processed by a processing core, data can be fetched and prepared for a second set of tiles, such that the processing core can immediately start processing the second set of tiles when it has completed the processing of the first set of tiles.

The sets of tiles are allocated to the processing cores in a raster scan order, so initially the first six sets of tiles from the top row of the rendering space (tiles 0,0 to 5,0) are allocated to the six processing cores $314_1$ to $314_6$. The sets of tiles take an amount of time to process as shown in FIG. 6 matching the respective cost indications for the sets. When a processing core finishes processing a set of tiles the next set of tiles according to the raster scan is allocated to that processing core (e.g. set 6,0 is allocated to processing core $314_1$ after time 2 when the first set of tiles 0,0 have been processed). The next row of sets of tiles (sets of tiles 0,1 to 6,1) are allocated according to the raster scan when processing cores complete the processing of a set of tiles. This scheduling continues as shown in FIG. 6 until after time 31 all of the sets of tiles in the rendering space 502 for the current render have been processed. Therefore, according to this scheduling scheme the render is complete after 31 time intervals. The time intervals could represent any suitable quantity of time or indication of a quantity of time (e.g. thousands of clock cycles). The hatched areas in FIG. 6 indicate times for which a processing core is idle. In this example, there are a total of 31 idle time slots across the processing cores for the render. It is noted that in the examples described herein a subsequent render does not begin to be processed by the processing cores before a current render has finished. So, these 31 idle time slots represent inefficiency in the graphics processing system, which may add delay to the renders performed by the graphics processing system.

The workload-based scheduling scheme as shown in FIG. 6 is better than a simple round robin scheduling scheme (in terms of rendering efficiency) but it still has some inefficiency when the processing cores are idle (shown with the hatched regions) caused by differing amounts of work involved in the processing of different tiles. FIG. 6 illustrates that the amount of inefficiency (i.e. the number of idle time slots) is largely determined by how late in the render expensive/slow sets of tiles are received and the amount of variation in the processing costs of tiles. These parameters are not known in advance of runtime and depend upon the images submitted for rendering by the application at run time.

FIG. 7 illustrates the timing of execution of the sets of tiles on a 6 core GPU when a scheduling method based on the cost indications is used to assign the sets to the processing cores. Using knowledge about which sets of tiles are likely to be expensive can be useful for scheduling the most expensive tiles first and use the relatively cheap/fast tile groups to fill in the gaps later in the render. The scheduling does not follow a raster scan; instead when a set of tiles is due to be assigned to a processing core (e.g. because the processing core finishes processing a set of tiles) then a set of tiles is selected from the sets of tiles of the render which have not yet been assigned to a processing core, the selection being based on the cost indications for the sets of tiles, rather than the spatial position of the sets of tiles in the rendering space. For example, the set of tiles with the highest cost indication of the remaining sets of tiles is assigned to a processing core. This results in an overall more efficient usage of the processing cores 314 as shown in FIG. 7, which shows the processing of the same tiles as in FIG. 6, but this time the render finishes after 27 time intervals, with fewer idle time slots. FIG. 7 shows just 7 idle time slots compared to the 31 idle times slots in FIG. 6. Therefore the render finishes sooner with the scheduling based on cost indications than with the scheduling shown in FIG. 6. Therefore the scheduling based on cost indications can provide a more efficient rendering process. A 13% reduction in the rendering time is achieved by the scheduling of FIG. 7 compared to the scheduling of FIG. 6 in the example shown (31−27/31=13%). The reduction in rendering time is dependent upon the workload (presence and distribution of expensive tiles) and the number of processing cores in the system. Example 3D game and benchmark content have shown reductions in overall frame render times in a range from 0 to 30% (compared to the workload-based scheduling shown in FIG. 6), with some outliers having even higher reductions. This can be a very significant improvement particularly if the graphics processing system 300 is rendering frames in real-time for display in real-time to a user, and particularly if the graphics processing system 300 is implemented on a device where the processing resources are under a tight constraint, e.g. on a mobile device such as a smart phone or tablet. The example shown in FIG. 7 is simplified in a similar manner to the example shown in FIG. 6 wherein sets of tiles are scheduled when processing cores become idle, such that rendering queues are not used, but it is to be appreciated that in more complex examples the rendering queues can be implemented with a scheduling method which assigns the sets of tiles to the processing cores based on the cost indications.

As mentioned above, even if the cost indications for tiles do not perfectly indicate the actual cost of processing the tiles such that a relatively cheap tile was scheduled early then the system would still remain more balanced than a conventional approach as the system would re-balance around it. So the cost indications do not have to be estimated perfectly, to generate a good result in terms of reducing the rendering time for a render. It is better to catch all of the expensive tiles and accidently include tiles that turn out to be cheaper than expected than to be conservative with identifying expensive tiles.

In the example described with reference to FIGS. 5a to 7, the scheduling logic 316 assigns the sets of tiles to the processing cores 314 based on the cost indications for the sets of tiles. Furthermore, the scheduling logic 316 may determine a processing order of tiles within a particular set of tiles. For example, the tiles within a particular set of tiles may be processed in raster scan order or boustrophedon order, or according to Morton order (which may be referred to as Z-order) or in accordance with a space filing curve which preserves spatial locality between consecutively processed tiles. Suitable space filling curves may include Peano curves and Hilbert curves to give two examples. In some examples, the tiles within a particular set of tiles may be processed in an order based on the cost indications of the tiles within that particular set.

In the examples described above, the cost indications for the sets of one or more tiles are used to schedule the sets of one or more tiles for rendering by the processing cores 314. In general, the cost indications for the sets of one or more tiles could be used to schedule the processing of the sets of one or more tiles on one or more processing cores. In some examples, when selecting the next tile or set of tiles to process, the scheduling logic 316 may use a combination of cost indication and distance from a previously scheduled tile (e.g. the last tile processed or scheduled for a processing core 314), to find a balance between cache coherency and scheduling optimisation. The relative importance of these factors may vary as the render progresses.

The processing performed by the one or more processing cores could be rendering as in the examples described above, or could be other processing such as video encoding. In the examples described above, the scheduling attempts to avoid starting the processing of an expensive tile near the end of a render. In the examples described above, the scheduling decision for a particular tile does not alter the manner in which that particular tile is subsequently rendered.

However, in other examples, the cost indications may be used for other purposes. For example, when a frame has been rendered it may be passed to a video encoder which encodes the frame according to a video encoding technique. The encoded video data is generally a compressed representation of the frames, which is suitable for transmission (e.g. to a display for display thereon) and/or for storage. As part of the video encoding, quantisation levels may be selected for encoding regions of a frame. The cost indications for the different tiles which are determined in the examples described above may be used to help the video encoder select suitable quantisation levels for encoding the different tiles. For example, the cost indications for the sets of one or more tiles may be provided to the video encoder with the rendered image data.

In other examples, the cost indications could be used to alter the manner in which different tiles are processed, e.g. the manner in which the tiles are rendered. For example, a high cost indication may indicate that there is a lot of detail in a tile (e.g. when the cost indications represent the number of primitives in a tile), in which case these tiles could be rendered with a greater level of detail (e.g. more sample positions per pixel could be processed in a rasterisation technique or more rays could be processed per pixel in a ray tracing technique). Alternatively, if there is a real-time constraint on the timing with which tiles are processed then tiles with a lot of detail (as indicated by the cost indications) may be processed with a lower level of detail to ensure that they are processed in time for the real-time constraint to be satisfied. For example, images may be rendered and directly displayed according to a raster scanning technique of the display. In this example, each tile may have a deadline by which it must be rendered in order to be displayed in real time as the raster scan of the display proceeds. If a tile is not rendered before its deadline then it might not be able to be displayed in a current frame, which can cause a stuttering effect in the displayed images. The cost indications provide some indication as to how long a tile will take to process and as such can be used to vary the level of detail of rendering a tile with the aim of ensuring that each tile is rendered before its deadline for providing the rendered tile to a display.

In general, a graphics processing unit which is configured to process graphics data using a rendering space which is sub-divided into a plurality of tiles may include one or more processing cores configured to process graphics data; cost indication logic configured to obtain a cost indication for each of a plurality of sets of one or more tiles of the rendering space, wherein the cost indication for a set of one or more tiles is suggestive of a cost of processing the set of one or more tiles; and scheduling logic configured to schedule, in dependence upon the cost indications, the sets of one or more tiles for processing on the one or more processing cores.

In some examples, which might not schedule tiles based on cost indications for the tiles, the scheduling logic 316 may subdivide one or more tiles for a render to form smaller subtiles for rendering. As described in detail below, in some situations this may help to reduce a total rendering time for a render. For example, subdividing expensive tiles into subtiles can allow a fairer distribution of work across multiple processing cores. The application of this method is particularly beneficial towards the end of each render and is an improvement upon simply reducing the size of tiles throughout all renders. The cost of each tile is directly determined by the size of the tile, i.e. smaller tiles have less overall work in them and therefore complete more quickly. The problem of long running tasks being scheduled towards the end of a render is reduced and the smaller size of work packets inherently allows for better load balancing using a simple/conventional scheduler.

FIGS. 8a and 8b provide an illustration that having a smaller tile size can reduce the rendering time for a render. FIG. 8a shows the work done by 32 processing cores (denoted 802) in a graphics processing system for rendering a frame using tiles which are 32×32 pixels in size. For each processing core the black line shows when the processing core is active, as a function of time increasing vertically downwards in the illustration. In the example shown in FIGS. 8a and 8b tiles have not been scheduled for rendering according to their cost indications, and as such a tile having a high processing cost may be assigned to a processing core near the end of the render. Instead in the example shown in FIGS. 8a and 8b the tiles are allocated according to a round robin scheduling method which preferentially schedules work to processing cores that have the least work queued up (similar to the example shown in FIG. 6 and described above). Since the tiles are relatively large in the example shown in FIG. 8a the work involved in processing a tile may be relatively large if it involves lots of costly processing, such as a large number of translucent primitives or the execution of long shader program for example. Therefore it can be seen in FIG. 8a that some of the processing cores are busy processing expensive tiles at the end of the render whilst other processing cores are idle because they have finished processing the tiles that were assigned to them and there are no more tiles that can be assigned to them. The render is complete at time 804.

FIG. 8b shows the work done by 32 processing cores (denoted 806) in a graphics processing system when rendering the same frame as for FIG. 8a, but this time using tiles which are 16×16 pixels in size (i.e. a quarter of the size of the tiles in the example of FIG. 8a). Because the tiles are smaller, each individual 16×16 tile involves less processing than an individual 32×32 tile, so the most costly 16×16 tiles are less costly than the most costly 32×32 tiles, such that expensive tiles being scheduled near the end of the render do not take as long to process. The render is complete at time 808 with 16×16 tiles. It can be seen that time 808 is earlier than time 804. This illustrates that in this example the total rendering time for the render is shorter with 16×16 tiles compared to with 32×32 tiles. The reduction to a 16×16 tile size has three primary effects:

1) Work distribution becomes more balanced across the processing cores (there are ¼ the number of pixels in each tile so the worst case slow tile is potentially ¼ the length).
2) The render finishes sooner with the 16×16 tile size because up to 40% of the run time for the 32×32 tiles was being bottlenecked/wasted waiting on a small number of slow running tiles.

3) Work in the render increases overall because a smaller tile size is less efficient (primitives that were in only one tile may now be present in 4 tiles as they cover the same screen area). This can be seen in FIGS. 8*a* and 8*b* in that across all of the processing cores, more processing is performed with 16×16 tiles than with 32×32 tiles (i.e. the area of black lines in FIG. 8*b* is larger than the area of black lines in FIG. 8*a*).

This third point means that smaller tiles may mean a larger amount of processing for performing a render, which may increase the processing power. This is a reason why it is not always beneficial to keep reducing the tile size.

Inefficiencies occur where some processing cores are still processing tiles when other processing cores are idle because they have finished processing tiles assigned to them for the current render. The greater the imbalance in workload towards the end of a render the worse the efficiency/utilisation of the GPU cores, i.e. the more time processing cores spend in an idle state. The problem only appears at the end of a render because even though different tiles may involve different amounts of work (i.e. the processing costs may be different for different tiles) throughout most of the render the basic scheduling policy used by the scheduling logic 316 still assigns work to the processing cores 314 for high utilisation most of the time. In some examples, tiles can be subdivided into smaller tiles near the end of a render, but not near the start of a render because it is only at the end of a render that the problem of larger tiles presents itself. Furthermore, this means that tiles near the start of the render can have a larger tile size which can be beneficial in terms of reducing the amount of processing involved in processing an area of the rendering space. In other words, the effective tile size can be changed towards the end of renders where the load balancing is most beneficial without incurring the general penalty of reducing the tile size across the entire render.

Furthermore, it may be desirable to optionally apply the subdivision of tiles to only those renders that exhibit tasks that "stick out" substantially from the end of renders. A task "sticks out" substantially from the end of a render if the task executes on a particular processing core for a substantial amount of time whilst other processing cores are idle because there are no more tasks to process for the render. Whether a render exhibits such tasks can be determined in several ways, e.g. based on a heuristic using previous frame information, using cost indications generated in any of the ways outlined above by the cost indication logic 320, or based on a threshold number of tiles that are still to be processed in the current render, where this threshold number may be fixed or may be related to either the total number of processing cores in the GPU or the number of idle processing cores in the GPU. A decision on whether to subdivide tiles could be based on the number of tiles (N) still to be scheduled and on the number of idle cores (M).

Figure 9:
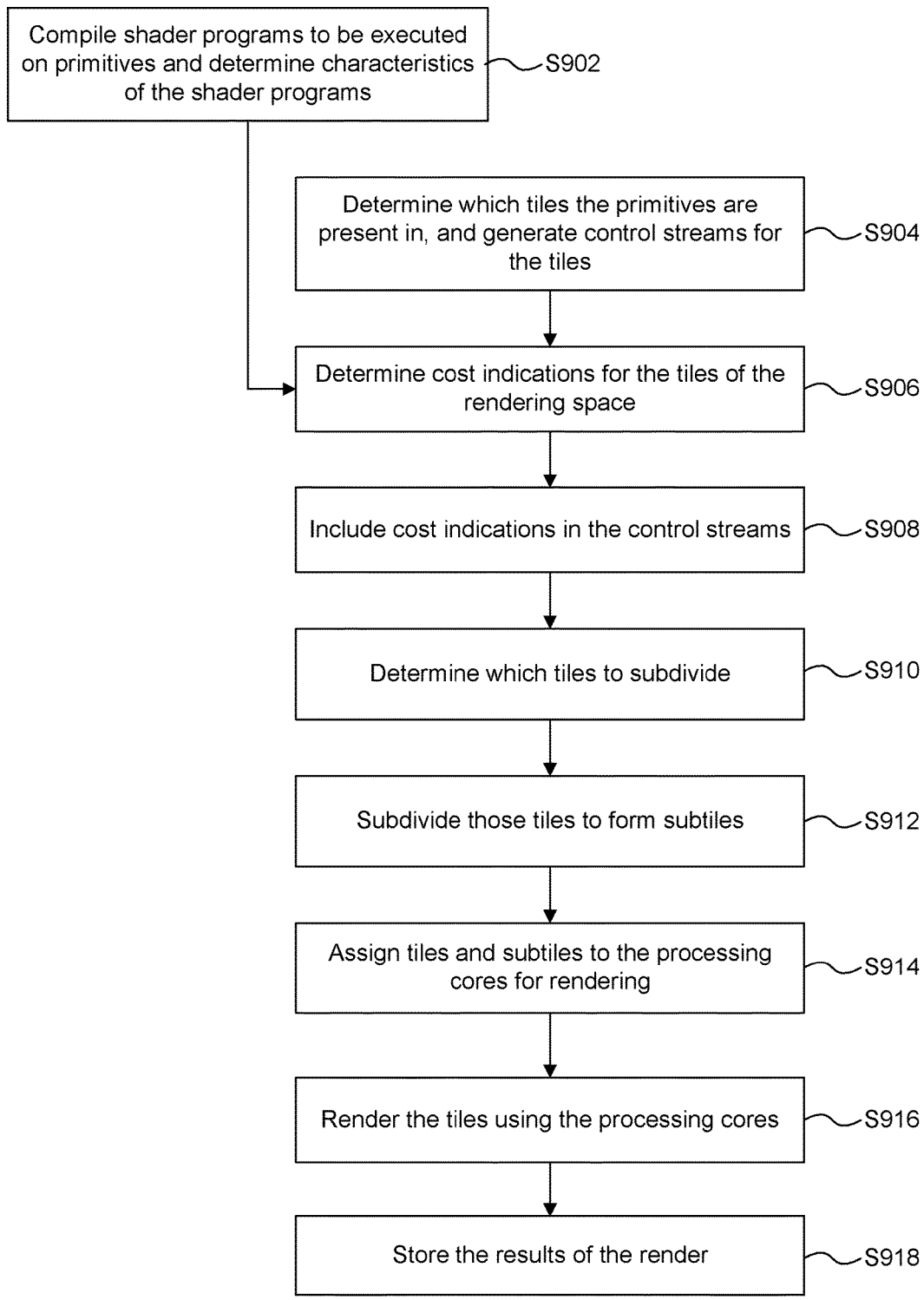
FIG. 9 is a flow chart for a method of processing graphics data using the graphics processing system in a further example.

FIG. 9 is a flow chart for a method involving the subdivision of tiles. The geometry processing phase may be the same as in the example described above with reference to FIG. 4. In other words, steps S902 to S908 may be the same as steps S402 to S408 described above, although in this example the use of cost indications for tiles is optional, so steps S906 and S908 might not be performed in some examples.

Figure 4:
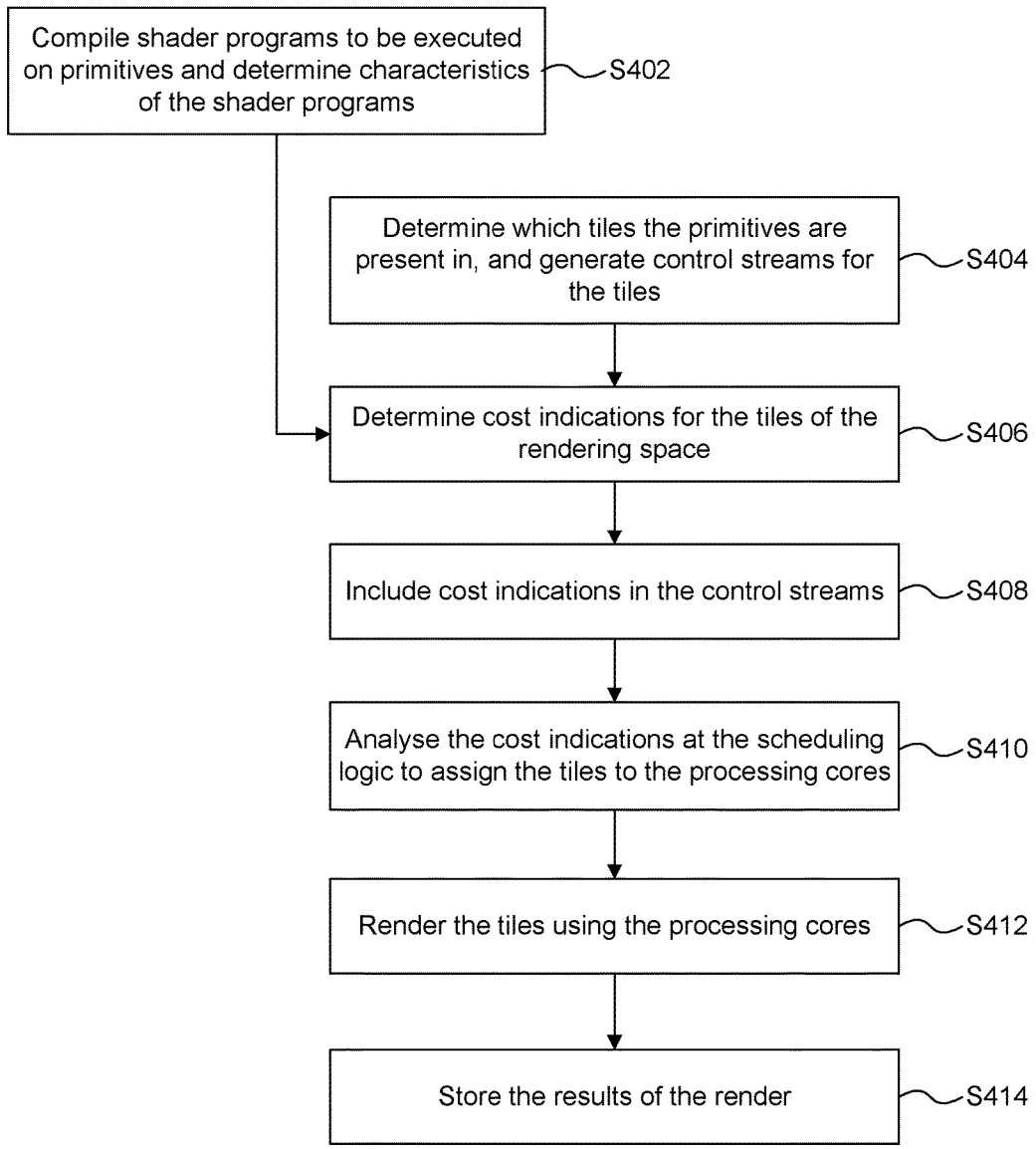
FIG. 4 is a flow chart for a method of processing graphics data using the graphics processing system.

It is noted that the steps shown in the flow charts in FIGS. 4 and 9 may take place in a sequence, or some of the steps may be performed simultaneously, i.e. in parallel. Furthermore, the steps do not necessarily occur in the order shown in the Figures.

The scheduling logic 316 determines how the tiles are to be assigned to the processing cores 314, i.e. how the tiles are to be scheduled for rendering on the processing cores 314. According to terminology used herein, a tile can be scheduled for rendering on a processing core by assigning the tile to the processing core for rendering. In step S910 the scheduling logic 316 determines which, if any, of the tiles are to be subdivided for the current render. For example, the scheduling logic 316 may determine which of the tiles to subdivide for the current render based on information relating to processing costs for corresponding tiles in a previous render. If a tile in a previous render (e.g. the immediately preceding frame in a sequence of frames being rendered) was particularly expensive to process (e.g. because it includes many primitives with an object type such as translucent or punch through or because the processing of the tile involves the execution of long shader programs) then the scheduling logic 316 may determine that it would be beneficial to subdivide that tile for the current render. As another example, if a tile was subdivided in a previous render then the scheduling logic 316 may determine that the tile should be subdivided in the current render also.

As another example, the scheduling logic 316 may determine which of the tiles to subdivide for the current render based on a relationship between the number of tiles that are still to be rendered in the current render and a threshold number of tiles. In this way the scheduling logic 316 may determine that tiles are to be subdivided only if they are near to the end of the render. The scheduling logic 316 may determine which of the tiles to subdivide for the current render further based on the number of said processing cores. For example, if there are more processing cores then to be considered "near" to the end of the render may mean that the threshold number of tiles is increased.

As another example, the scheduling logic 316 may determine which of the tiles to subdivide for the current render based on the cost indications for the tiles. For example, only expensive tiles might be subdivided because these are the tiles that might cause a render to be delayed whilst some processing cores are idle at the end of the render. The cost indications may be determined by the cost indication logic 320 as described above, and may be quantised as described above.

The scheduling logic 316 may use a metric to determine which of the tiles to subdivide for the current render. For example, the scheduling logic 316 may subdivide tiles according to a metric according to which a likelihood of a tile being subdivided is increased if a cost indication that is associated with the tile is increased. Alternatively, or additionally, the scheduling logic 316 may subdivide tiles according to a metric according to which a likelihood of a tile being subdivided is increased if the number of tiles of the current render that are still to be rendered is decreased. Alternatively, or additionally, the scheduling logic 316 may subdivide tiles according to a metric according to which a likelihood of a tile being subdivided is increased if the number of processing cores is increased. The metric may take one or more factors into account to allow the scheduling logic 316 to make a decision as to which tiles to subdivide.

Step S910, to determine which tiles to subdivide, may be performed up front in a pass which makes a decision for all tiles about which will be processed and how. In some examples, the subdivision process could be performed as a loop over each tile, such that for each tile, the cost estimation values are read and a decision is made about whether the tile should be subdivided or not, and then the loop goes around to process the next tile.

In step S912 the scheduling logic 316 subdivides tiles which were determined as being for subdivision in step S910. Tiles may be subdivided into any suitable number of subtiles, e.g. tiles may be subdivided into two halves or four quarters. For example a 32×32 tile may be subdivided into four 16×16 subtiles. There is no requirement that the system be limited to modulo 2 values, so a tile may be subdivided into three subtiles as an example. Similarly, there is no requirement that the subdivision must subdivide the tile equally among the processing cores. For example, a tile which includes 32×32 pixels may be divided amongst five idle cores. If the tile was divided equally amongst the cores, then that would result in 204.8 pixels per tile. In a practical system, slightly different sized subtiles may be provided to the different cores, e.g. such that each core receives a (probably rectangular) block of pixels to process, rather than render the same pixel in multiple subtiles. Although it may be simpler to subdivide a tile into subtiles of equal size and shape, there is no requirement that a tile is subdivided into subtiles of equal size or equal shape.

Figure 10A:
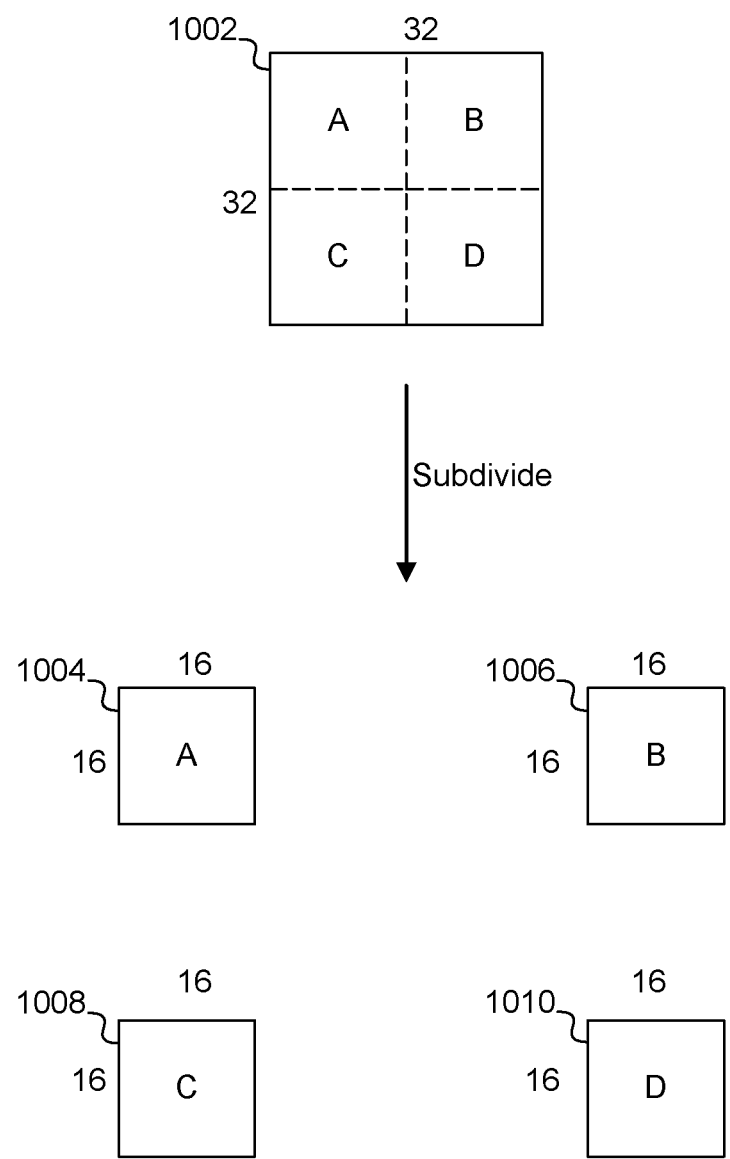
FIG. 10a illustrates a process of subdividing a tile in a first example.

FIG. 10a shows an example where a 32×32 tile 1002 is subdivided to form four 16×16 subtiles denoted 1004, 1006, 1008 and 1010 in FIG. 10a. The separate subtiles can be assigned to different processing cores for rendering. In this example, control stream data may be determined for each of the subtiles 1004 to 1010. For example, separate control stream data may be determined for each of the subtiles 1004 to 1010. Alternatively, the subtiles 1004 to 1010 may share the control stream data for the tile 1002 and then a mask (e.g. a 4-bit mask where there are four subtiles) may be included for each primitive identified in the control stream to indicate which of the four subtiles the primitive is valid in. If a particular subtile (e.g. subtile A 1004) is assigned to a particular processing core (e.g. processing core $314_1$) that particular processing core (e.g. $314_1$) can receive the control stream data for the particular subtile (e.g. 1004) in order to render the particular subtile (e.g. 1004).

Figure 10B:
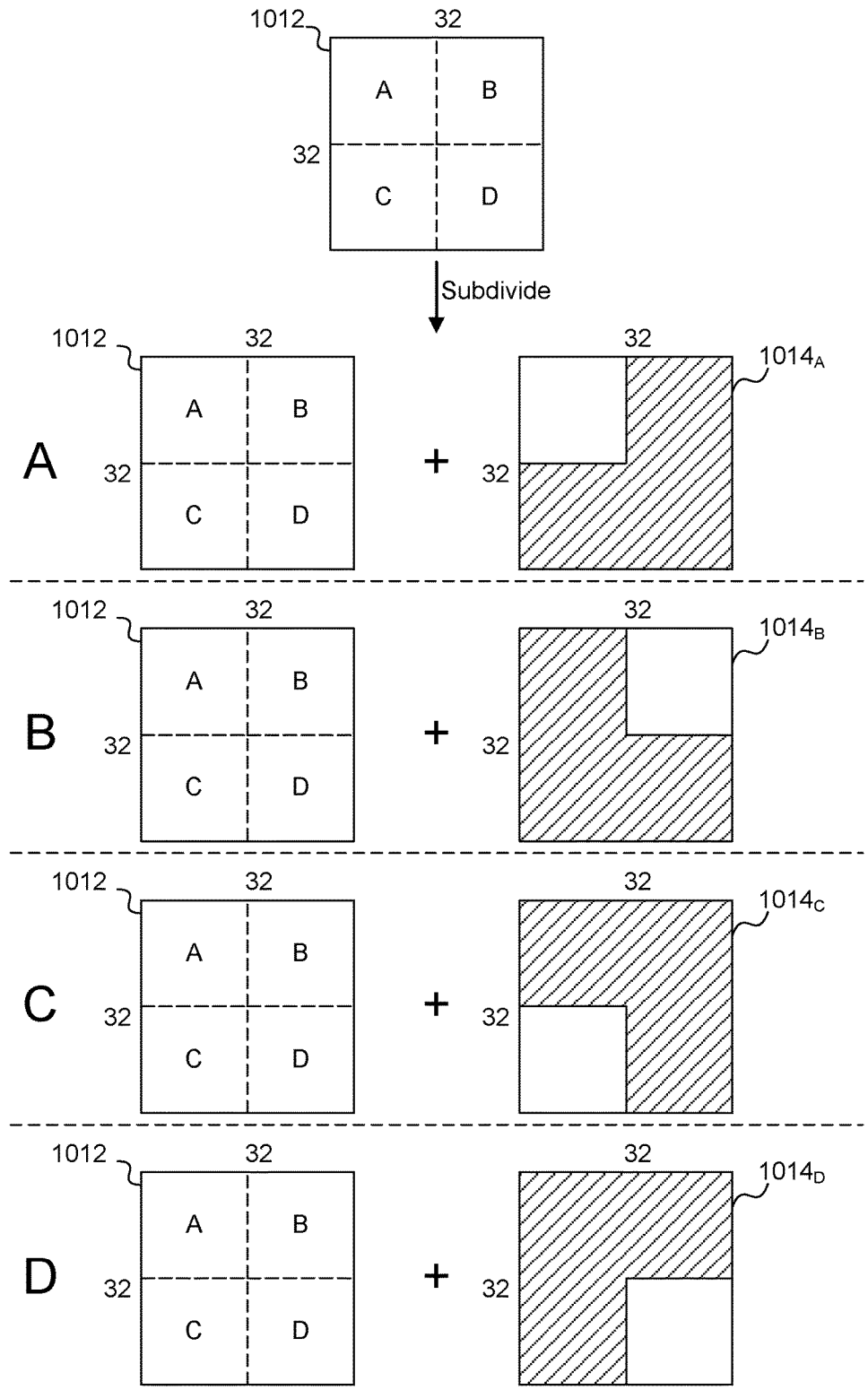
FIG. 10b illustrates a process of subdividing a tile in a second example.

FIG. 10b shows another example of subdividing a 32×32 tile 1012. In this example, the subdivision process does not separate the tile 1012 into smaller subtiles to be provided to processing cores 314. Instead, the whole tile 1012 (i.e. the control stream for the whole tile) is provided to the appropriate processing cores along with a mask 1014 (which uses very little data, e.g. a 2-bit mask in the example that the tile 1012 is subdivided into quarters) which indicates which portion of the tile 1012 is valid for a particular subtile. In a more flexible example, a mask for a particular subtile may include a bit per pixel to indicate whether each particular pixel is valid for the particular subtile. This would allow more flexibility in the way in which a tile is subdivided, but it means that the masks include more data (e.g. a bit per pixel, rather than just two bits for the whole tile (which may for example include 1024 pixels)). The hatched region of a mask 1014 represents an invalid region, whilst the unhatched region of a mask 1014 represents a valid region of the tile 1012. In other words, to modify the effective tile size a tile with a mask can be submitted to indicate which pixels of the tile should be processed by a given processing core. Extending this idea further we can split the work of any tile across multiple processing cores by submitting the same tile to 'N' processing cores and providing masks to indicate which pixels each processing core is responsible for.

For example, the scheduling logic 316 may determine a plurality of masks ($1014_A$, $1014_B$, $1014_C$ and $1014_D$) which indicate valid regions of the tile 1012 for the respective plurality of subtiles (A, B, C and D), wherein a particular processing core is configured to receive data for a particular subtile assigned to the particular processing core by receiving: (i) data for a particular tile 1012 from which the particular subtile is derived, and (ii) a respective mask for the particular subtile. For example, subtile A may be assigned to processing core $314_1$ so the processing core $314_1$ will receive the control stream for the tile 1012 and the mask $1014_A$ which indicates that the top left quadrant of the tile 1012 is valid for subtile A; subtile B may be assigned to processing core $314_2$ so the processing core $314_2$ will receive the control stream for the tile 1012 and the mask $1014_B$ which indicates that the top right quadrant of the tile 1012 is valid for subtile B; subtile C may be assigned to processing core $314_3$ so the processing core $314_3$ will receive the control stream for the tile 1012 and the mask $1014_C$ which indicates that the bottom left quadrant of the tile 1012 is valid for subtile C; and subtile D may be assigned to processing core $314_4$ so the processing core $314_4$ will receive the control stream for the tile 1012 and the mask $1014_D$ which indicates that the bottom right quadrant of the tile 1012 is valid for subtile D.

In step S914 tiles and subtiles are assigned to the processing cores for rendering. This may be done in a similar to that described above, e.g. by adding identifiers of the tiles or subtiles to a rendering queue 318 for each of the processing cores 314. Tiles and/or subtiles may be assigned to a processing core based on the workload queued for the processing core, e.g. when the number of tiles and/or subtiles currently queued for a particular processing core drops below a threshold number then one or more tiles and/or subtiles can be assigned to the particular processing core.

At least some of the subtiles derived from the same tile are assigned to different processing cores for rendering. In other words, subtiles derived from a tile are distributed to a plurality of the processing cores 314 for rendering. For example, the subtiles (e.g. subtiles A to D) derived from a particular tile (e.g. tile 1012) are assigned to a plurality of the processing cores (e.g. to processing cores $314_1$ to $314_4$), i.e. one or more subtile (e.g. subtile A) derived from the particular tile 1012 is assigned to a first processing core (e.g. $314_1$) and one or more subtile (e.g. subtile B) derived from the particular tile 1012 is assigned to a second processing core (e.g. $314_2$), where the first processing core (e.g. $314_1$) is a different processing core to the second processing core (e.g. $314_2$).

Steps S916 and S918 are similar to steps S412 and S414 described above. In step S916 the processing cores 314 render the assigned tiles and assigned subtiles. The rendering is performed as described above, e.g. by performing hidden surface removal and texturing/shading on primitive fragments which are present within the tiles or subtiles that are being rendered.

In step S918 the results of the render are stored, e.g. in the memory $304_2$.

The method of subdividing tiles into subtiles and processing the subtiles on different processing cores may be less efficient (e.g. in terms of the amount of processing power used) than processing a full tile on a single processing core because redundant data may be read and processed for a tile on each of the multiple processing cores which process subtiles derived from the same tile. However, when the processing overhead is lower than the penalty of not load balancing the system the net effect of subdividing some tiles (e.g. subdividing expensive tiles near the end of a render) can be considered to be an overall improvement for the system. This is why even the extreme example shown in FIGS. 8a and 8b in which the tile size for all tiles is quartered, the smaller tile size still comes out faster than being bottlenecked by the slow tiles. The hybrid subdivision method described herein where large tile sizes are used for some tiles of a render (e.g. tiles near the start of a render and/or tiles which have low cost indications) and smaller tile sizes are used for other tiles (e.g. tiles near the end of a render and/or tiles which have high cost indications) for example by subdividing the larger tiles, results in a system that is faster than the large tile size due to the load balancing improvements and faster than the small tile size due to incurring the overhead only for some of the tiles. Counter-intuitively a source of inefficiency has been added to a small part of the render (by reducing the tile size for some tiles) to increase the efficiency of the system as a whole.

As described above the scheduling logic 316 may assign the tiles to the processing cores 314 in sets of one or more tiles. Furthermore, as described above, each of the processing cores 314 may have access to at least one cache for storing data (e.g. primitive data or texture data) to be used for rendering primitives in a tile. The scheduling logic 316 may assign subtiles derived from the same tile to processing cores 314 which have access to the same cache. In this way the data for the tile can be stored in the cache and used by each of the processing cores, with appropriate masks 1014, to render the different subtiles derived from that tile. This may reduce the number of caches in which the data for the tile is stored, which can improve the efficiency of the cache system. Similarly, it may be desirable to be aware of the underlying cache structure when subdividing and scheduling tiles for different cores, e.g. to try to avoid scheduling sub-tiles derived from the same tile such that they are processed on cores that use different caches.

In the examples described above, tiles are subdivided into subtiles. However, the same subdivision process can be used to subdivide a set of tiles into smaller subsets of tiles. In general, a set of one or more tiles can be subdivided into a plurality of subunits, where this subdivision can either be a subdivision of a tile into a plurality of subtiles (such that the "subunits" are subtiles), or a subdivision of a set of tiles into a subset of one or more tiles (such that the "subunits" are subsets of one or more tiles). The number of tiles in the set of one or more tiles (prior to any subdivision) is an implementation choice, e.g. in some implementations single tiles are scheduled to processing cores whereas in other implementations groups of tiles are scheduled to processing cores.

As an example, sets of six tiles (e.g. 3×2 blocks of tiles) may be submitted to a single processing core, and each set may have a cost estimate (e.g. a quantised cost estimate) stored for it. The individual tiles within the set may, or may not, have individual cost estimates stored for them. The set of tiles may be subdivided into smaller subsets of tiles (e.g. two subsets of three tiles each, three subsets of two tiles each, or six subsets of one tile each, to give just some examples) to be sent to a plurality of available processing cores. For example, if the final set of tiles submitted right at the end of the render is a 3×2 block of tiles and the cost estimate for the set is very high (e.g. because the pre-pass over all the tile costs has not been performed) then it might be more efficient to subdivide the set of tiles into multiple subsets of tiles (e.g. six single tiles) to be processed by multiple cores (e.g. six cores) before considering whether to further subdivide any of the tiles into subtiles.

There is a tradeoff of cache efficiency on the level of subdivision that makes sense for each set of tiles, which may be dependent upon the estimated cost of processing the set of tiles and the underlying architectural cache layouts. For example, if four processing cores are connected to the same cache then there may be a relatively small penalty to splitting a set of tiles into four subunits, but if a set of tiles is split up into greater than four subunits (e.g. into six subunits) then there may be a relatively large penalty as the set of tiles would then span into another cache (i.e. data for the set of tiles would need to be written into another cache).

The processing logic 313 may include a large number of the processing cores 314, e.g. in some examples the processing logic 313 may include at least 100 processing cores. When the number of tiles is not much greater than the number of processing cores it becomes more likely that a tile will be scheduled "near the end" of a render, and as such it becomes more likely that an expensive tile may delay the render finish time. Therefore, with such a large number of processing cores 314, it can become more beneficial to subdivide the sets of one or more tiles, in particular the expensive sets of one or more tiles.

In the subdivision methods described above, the scheduling logic 316 subdivides a tile into smaller subtiles. However, in other examples, the tiling unit 308 could process some tiles with a smaller size than other tiles in a render to achieve a similar result in that some tiles can have a smaller effective tile size than other tiles. For example, if tiles are to be assigned in a raster scan order (i.e. not according to cost indications) then the tiling unit will know which tiles are to be assigned to a processing core near the end of a render (e.g. the bottom row(s) of tiles of the rendering space), and as such it may be useful to subdivide these tiles into smaller tiles such that control stream data is determined in the tiling unit 308 for the subtiles near the end of the render. In other examples, the tiling unit 308 may decide which tiles are to be rendered with a smaller tile size based on other factors. In this example, larger tiles are not subdivided in the scheduling logic 316, and instead some tiles are processed with a smaller size than other tiles in the geometry processing phase and in the rendering phase, so in a sense these tiles can be considered to be subdivided in the tiling phase.

In the examples described above the graphics processing system 300 comprises a plurality of processing cores 314. However, in some examples, a graphics processing system may include just a single processing core. The subdivision methods described above can be useful for subdividing work which is all to be processed by a single processing core. Therefore, the scheduling logic may assign all of the subtiles derived from a tile to a single processing core. This can be useful, e.g. if the processing core is able to switch between processing different subtiles. For example, the processing core may be able to store the state of a partially processed subtile (e.g. the state of a depth buffer and a tag buffer) while performing processing on a different one of the subunits. In this way, the processing core may be considered to have "multiple subtiles in flight". Having multiple subtiles in flight may be more efficient (in some scenarios) than having a single, larger tile in flight, because the parallelism of the processing performed by the processing core can be improved. The concept of having multiple tiles in flight in the rendering logic is described in granted patent GB2520365, and this concept can be extended to having multiple subtiles in flight. Similar advantages can be achieved.

For example, a graphics processing system may be configured to allow the processing of primitives to switch between primitives of different subtiles before all of the primitives of a particular subtile have finished being processed (thereby allowing the graphics processing system to have "multiple subtiles in flight", i.e. multiple subtiles for which the primitives are partially processed at a given time).

In order to achieve this the graphics processing system may comprise a plurality of depth buffers for storing depths of respective subtiles in flight and other memory for storing other state data (e.g. a plurality of tag buffers for storing tags of primitives for which depths are stored in respective ones of the plurality of depth buffers) for a partially processed subtile while a different subtile is being processed. If the system processes the subtiles of a single full tile at a time then the storage would not necessarily be increased (compared to processing full tiles without subdivision) because the storage (e.g. depth buffers and buffers for other state data) for the full tile can be subdivided and redistributed to the subtiles. Splitting the work within a single processing core by subdividing a tile into subtiles means that a greater number of smaller passes are performed, which can allow the work to flow more smoothly through the processing core. For example, filling larger buffers (e.g. a depth buffer and a tag buffer) for a whole tile with results of depth testing could take long enough for shading engines to run out of work (or begin to run out of work), thereby reducing the efficiency of the shading engines. In contrast, results of depth testing for subtiles may be written into smaller buffers (corresponding to the subtiles) more quickly so it is less likely that the shading engines will run out of work when the graphics processing system processes subtiles rather than tiles. Furthermore, dependencies within areas of a tile (e.g. overlapping punch-through primitives) can cause stalls in the processing flow; whereas subdividing a tile can allow subtiles to be processed in parallel such that if one subtile stalls a different subtile can be processed. This reduces the likelihood of the whole system stalling.

Processing subtiles rather than tiles can slightly reduce the processing efficiency (e.g. SIMD processing efficiency) because a primitive spanning multiple subtiles will be processed as multiple separate tasks which may run at different times, such that the task occupancy may be reduced. However, this disadvantage can be outweighed at the end of a render by the advantage of reducing the total render time, e.g. for the last tile left running in a core. Therefore, in some examples, the subdivision might only be used for tiles near the end of a render.

In the description above, methods of determining the order in which tiles are processed in the processing logic 313 based on cost indications for the tiles are described, and methods of subdividing sets of one or more tiles to be rendered are described. These methods may be used separately or in combination. That is, each method is useful in its own right and can reduce the render time when implemented without the other method. Using both methods together may reduce the render time compared to using just one of the methods, particularly if there are a large number of processing cores (e.g. 100 processing cores) implemented in the processing logic 313. When using both methods together the more costly tiles are processed first, and some of the tiles are subdivided if they may delay the render finish time while some processing cores are idle.

Figure 11:
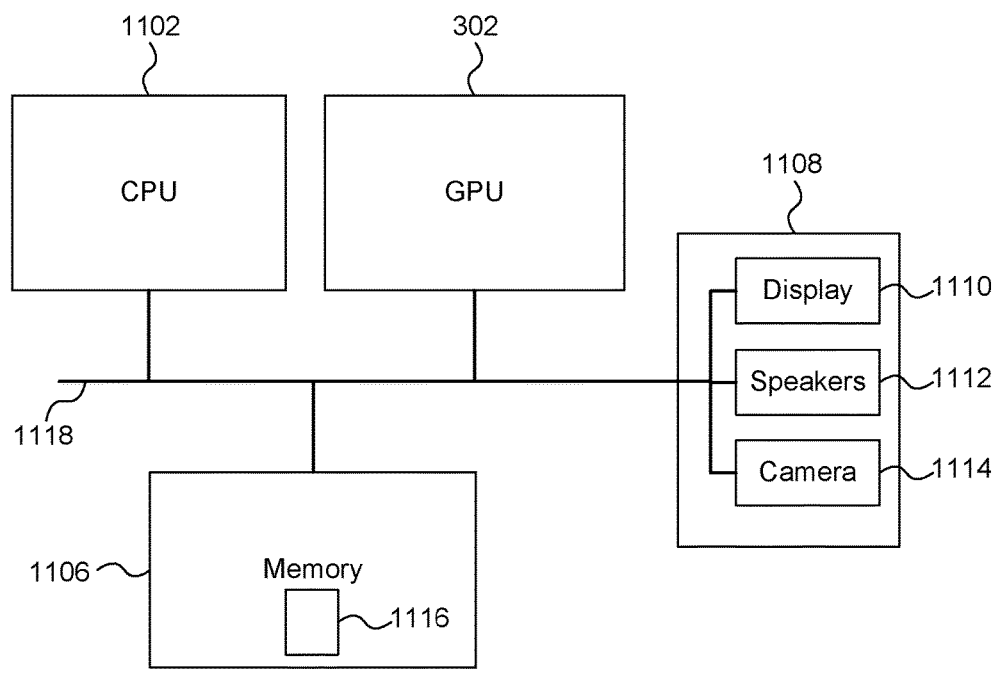
FIG. 11 shows a computer system in which a graphics processing system is implemented.

FIG. 11 shows a computer system in which the graphics processing systems described herein may be implemented. The computer system comprises a CPU 1102, a GPU 302, a memory 1106 and other devices 1108, such as a display 1110, speakers 1112 and a camera 1114. The components of the computer system can communicate with each other via a communications bus 1118. A store 1116 (corresponding to memories $304_1$ and $304_2$) is implemented as part of the memory 1106.

The graphics processing system 300 of FIG. 3 is shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

Therefore, there may be provided a method of manufacturing, at an integrated circuit manufacturing system, a graphics processing unit as described herein. Furthermore, there may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 12.

Figure 12:
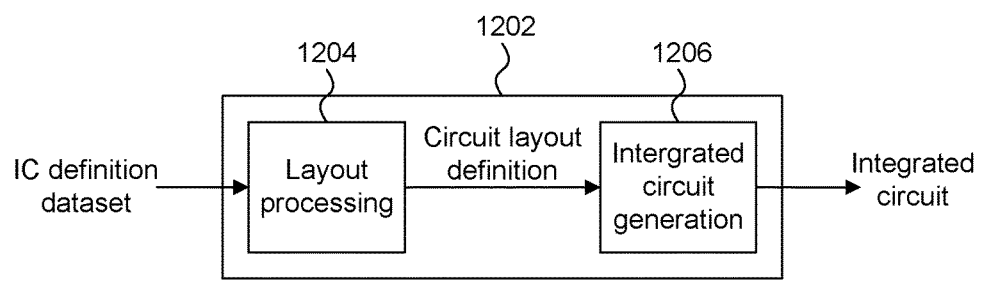
FIG. 12 shows an integrated circuit manufacturing system for generating an integrated circuit embodying a graphics processing system.

FIG. 12 shows an example of an integrated circuit (IC) manufacturing system 1202 which is configured to manufacture a graphics processing unit as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 1002 to manufacture an integrated circuit embodying a graphics processing unit as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A graphics processing unit configured to process graphics data using a rendering space which is sub-divided into a plurality of tiles, the graphics processing unit comprising:
   a plurality of processing cores configured to render graphics data;
   cost indication logic configured to obtain a cost indication for each of a plurality of sets of one or more tiles of the rendering space, wherein the cost indication for a set of one or more tiles is suggestive of a cost of processing the set of one or more tiles, wherein the cost indication logic is configured to quantise the cost indications to be represented by a number of bits, the number of bits being in a range from 1 to 8, and wherein the graphics processing unit is configured to store the cost indications; and
   scheduling logic configured to assign, in dependence upon the cost indications, the sets of one or more tiles to the processing cores for rendering.

2. The graphics processing unit of claim 1 wherein the scheduling logic assigns the sets of one or more tiles for a render to the processing cores in an order depending upon the cost indications.

3. The graphics processing unit of claim 1 wherein the scheduling logic assigns a plurality of sets with the highest cost indications to different processing cores.

4. The graphics processing unit of claim 1 wherein the cost indication logic is configured to determine the cost indications for the sets of one or more tiles of the rendering space.

5. The graphics processing unit of claim 4 wherein the cost indication logic is configured to determine a cost indication for a tile of the rendering space by combining scores associated with primitives which are present in the tile, wherein the score associated with a primitive is dependent upon an object type of an object of which the primitive is a part.

6. The graphics processing unit of claim 4 wherein the cost indication logic is configured to determine a cost indication for a tile of the rendering space based on one or more of the following factors:
   (i) a number of primitives in the tile;
   (ii) object types associated with the primitives in the tile;
   (iii) tile coverage area of the primitives in the tile;
   (iv) characteristics of one or more shader programs which are to be executed for rendering the primitives in the tile;
   (v) a user input; and
   (vi) a processing cost of a corresponding tile in a previous render.

7. The graphics processing unit of claim 6 wherein the characteristics of a shader program include one or more of:
   (i) a length of the shader program;
   (ii) an amount of resources or registers used by the shader program;
   (iii) whether the shader program includes conditional flow control;
   (iv) whether the shader program includes loops for which the number of repetitions is undefined at compile time; and
   (v) an amount of memory reads and/or writes used in the shader program.

8. The graphics processing unit of claim 6 wherein the graphics processing unit is configured to receive, from a compiler, the characteristics of the one or more shader programs which are to be executed for rendering the primitives in the tile.

9. The graphics processing unit of claim 1 wherein the scheduling logic is configured to form a priority queue for sets of tiles for each of the different quantised cost indication values, and to assign the sets of one or more tiles to the processing cores for rendering in an order according to the contents of the priority queues.

10. The graphics processing unit of claim 1 wherein the sets of one or more tiles each comprise a plurality of tiles.

11. The graphics processing unit of claim 10 wherein the cost indication logic is configured to:
   obtain a respective cost indication for each of the tiles of a set of tiles; and
   determine the cost indication for the set of tiles based on the cost indications of the tiles within that set.

12. The graphics processing unit of claim 11 wherein the cost indication logic is configured to determine the cost indication for a set of tiles by determining: (i) an average of the cost indications of the tiles within that set, (ii) a sum of the cost indications of the tiles within that set, (iii) a maximum of the cost indications of the tiles within that set, or (iv) a number of the tiles within that set which have cost indications above a threshold.

13. The graphics processing unit of claim 10 wherein the scheduling logic is configured to determine a processing order of tiles within a particular set of tiles based on the cost indications of the tiles within that particular set.

14. The graphics processing unit of claim 1 wherein the graphics processing unit comprises geometry processing logic and rendering logic,
   wherein the geometry processing logic includes a tiling unit configured to generate control streams for the tiles of the rendering space indicating which primitives are present in the tiles,
   wherein the cost indication logic is implemented as part of the geometry processing logic,
   wherein the rendering logic comprises the processing cores and is configured to render primitives in tiles of the rendering space in accordance with the generated control streams, and wherein the scheduling logic determines the assignment of sets of one or more tiles to the processing cores of the rendering logic.

15. The graphics processing unit of claim 14 wherein the tiling unit is configured to include the cost indications in the control streams for the tiles.

16. The graphics processing unit of claim 14 wherein the scheduling logic is configured to add sets of tiles to respective rendering queues for the processing cores during rendering in accordance with the occupancy of the rendering queues.

17. A method of processing graphics data in a graphics processing system which comprises a plurality of processing cores configured to render graphics data, the graphics processing system being configured to use a rendering space which is sub-divided into a plurality of tiles, the method comprising:
  obtaining a cost indication for each of a plurality of sets of one or more tiles of the rendering space, wherein the cost indication for a set of one or more tiles is suggestive of a cost of processing the set of one or more tiles, wherein the cost indications are quantised to be represented by a number of bits, the number of bits being in a range from 1 to 8;
  storing the cost indications; and
  assigning, in dependence upon the cost indications, the sets of one or more tiles to the processing cores for rendering.

18. The method of claim 17 further comprising forming a priority queue for sets of tiles for each of the different quantised cost indication values, wherein the sets of one or more tiles are assigned to the processing cores for rendering in an order according to the contents of the priority queues.

19. A non-transitory computer readable storage medium having stored thereon a computer readable description of an integrated circuit that, when processed in an integrated circuit manufacturing system, causes the integrated circuit manufacturing system to manufacture a graphics processing unit which is configured to process graphics data using a rendering space which is sub-divided into a plurality of tiles, wherein the graphics processing unit comprises:
  a plurality of processing cores configured to render graphics data;
  cost indication logic configured to obtain a cost indication for each of a plurality of sets of one or more tiles of the rendering space, wherein the cost indication for a set of one or more tiles is suggestive of a cost of processing the set of one or more tiles, wherein the cost indication logic is configured to quantise the cost indications to be represented by a number of bits, the number of bits being in a range from 1 to 8, and wherein the graphics processing unit is configured to store the cost indications; and
  scheduling logic configured to assign, in dependence upon the cost indications, the sets of one or more tiles to the processing cores for rendering.

* * * * *